United States Patent
Nash et al.

(10) Patent No.: US 10,157,439 B2
(45) Date of Patent: Dec. 18, 2018

(54) SYSTEMS AND METHODS FOR SELECTING AN IMAGE TRANSFORM

(71) Applicant: QUALCOMM Incorporated, San Diego, CA (US)

(72) Inventors: James Nash, San Diego, CA (US); Kalin Mitkov Atanassov, San Diego, CA (US); Hasib Ahmed Siddiqui, San Diego, CA (US); Albrecht Johannes Lindner, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 14/991,871

(22) Filed: Jan. 8, 2016

(65) Prior Publication Data

US 2017/0024846 A1 Jan. 26, 2017

Related U.S. Application Data

(60) Provisional application No. 62/194,718, filed on Jul. 20, 2015.

(51) Int. Cl.
*G06K 9/36* (2006.01)
*G06T 1/20* (2006.01)
*G06F 3/0484* (2013.01)
*G06F 3/0488* (2013.01)
*H04N 5/14* (2006.01)
(Continued)

(52) U.S. Cl.
CPC ............ *G06T 1/20* (2013.01); *G06F 3/0488* (2013.01); *G06F 3/04842* (2013.01);
(Continued)

(58) Field of Classification Search
CPC ........... G06T 1/20; G06T 7/33; G06T 3/0068; G06T 7/0028; G06T 3/0056;
(Continued)

(56) References Cited

U.S. PATENT DOCUMENTS 6,094,507 A * 7/2000 Monden ............ G06K 9/00093
382/124
6,606,404 B1 8/2003 Zhang et al.
(Continued)

FOREIGN PATENT DOCUMENTS

WO 2013182873 A1 12/2013

OTHER PUBLICATIONS

Chailloux C., et al., "Intensity-Based Block Matching Algorithm for Mosaicing Sonar Images," IEEE Journal of Oceanic Engineering, Oct. 2011, vol. 36 (4), pp. 627-645.
(Continued)

*Primary Examiner* — Duy M Dang
(74) *Attorney, Agent, or Firm* — Austin Rapp

(57) ABSTRACT

An electronic device for selecting a transform is described. The electronic device includes at least one image sensor, a memory, and a processor coupled to the memory and to the at least one image sensor. The processor is configured to obtain at least two images from the at least one image sensor. The processor is also configured to characterize structural content of each of the at least two images to produce a characterization for each image that is relevant to transform performance. The processor is further configured to select at least one transform from a set of transforms based on the characterization. The processor is additionally configured to apply the at least one transform to at least one of the images to substantially align the at least two images.

30 Claims, 18 Drawing Sheets

(51) Int. Cl.
*G06T 3/00* (2006.01)
*H04N 5/232* (2006.01)
*G06T 7/30* (2017.01)

(52) U.S. Cl.
CPC .............. *G06T 3/0068* (2013.01); *G06T 7/30* (2017.01); *H04N 5/145* (2013.01); *H04N 5/232* (2013.01); *H04N 5/23238* (2013.01); *H04N 5/23296* (2013.01)

(58) Field of Classification Search
CPC ... G06F 3/04842; G06F 3/0488; H04N 5/145; H04N 13/0246; G03T 3/00
See application file for complete search history.

(56) References Cited

U.S. PATENT DOCUMENTS

| | | | |
|---|---|---|---|
| 7,693,348 B2 | 4/2010 | Zavadsky et al. | |
| 7,756,358 B2 | 7/2010 | Deng et al. | |
| 8,331,654 B2 | 12/2012 | Abraham et al. | |
| 2004/0103101 A1 | 5/2004 | Stubler et al. | |
| 2005/0036036 A1* | 2/2005 | Stevenson | G08B 13/19608 348/211.99 |
| 2010/0008426 A1* | 1/2010 | Madden | G06T 9/00 375/240.18 |
| 2013/0064430 A1 | 3/2013 | Nakano | |
| 2014/0105495 A1* | 4/2014 | Madden | H04N 1/6052 382/166 |

OTHER PUBLICATIONS

International Search Report and Written Opinion—PCT/US2016/040544—ISA/EPO—dated Sep. 14, 2016.
"Image Processing Toolbox—for use with MAT LAB. Users's Guide, Version 3", Image Processing Toolbox User's Guide, Apr. 2, 2001 (Apr. 2, 2001), 34 Pages, XP002298331.

* cited by examiner

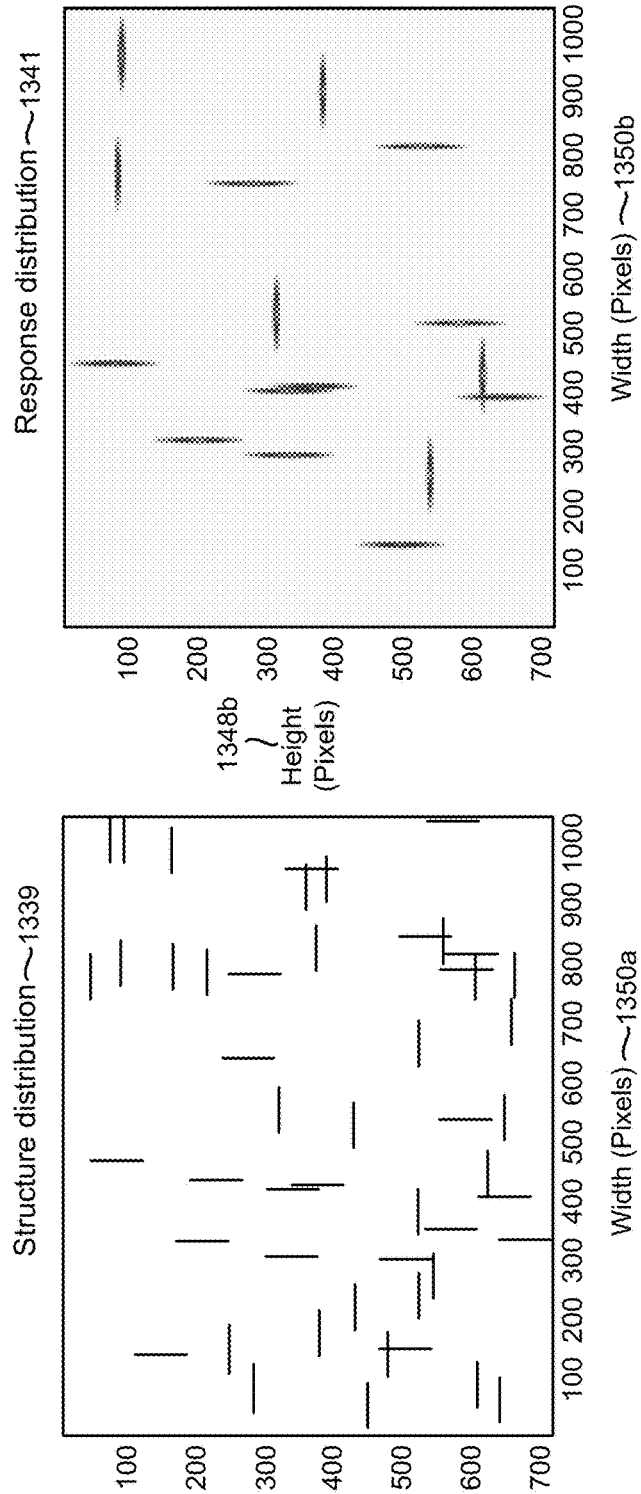

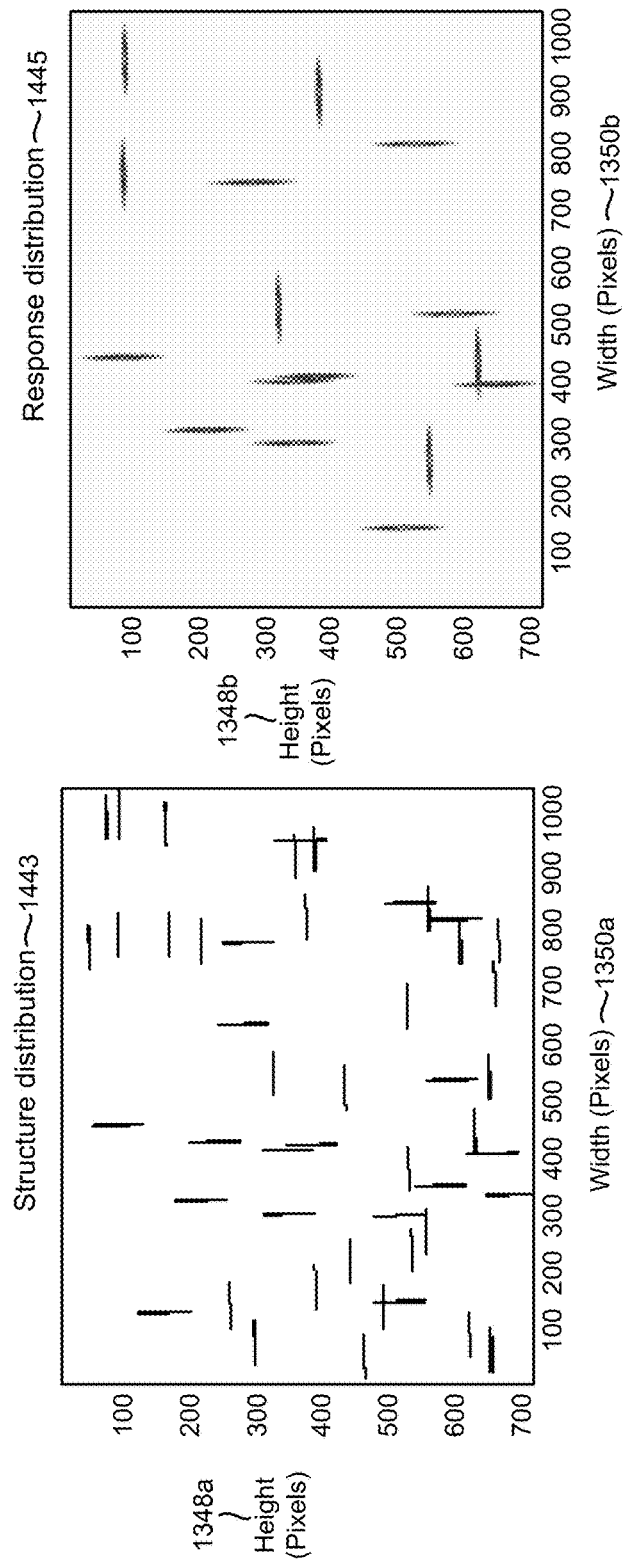

SYSTEMS AND METHODS FOR SELECTING AN IMAGE TRANSFORM

RELATED APPLICATION

This application is related to and claims priority to U.S. Provisional Patent Application Ser. No. 62/194,718, filed Jul. 20, 2015, for "SYSTEMS AND METHODS FOR SELECTING AN IMAGE TRANSFORM."

FIELD OF DISCLOSURE

The present disclosure relates generally to electronic devices. More specifically, the present disclosure relates to systems and methods for selecting an image transform.

BACKGROUND

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or utilize images. For example, a smartphone may capture and/or process still and/or video images. Processing images may demand a relatively large amount of time, memory, and energy resources. The resources demanded may vary in accordance with the complexity of the processing.

Some kinds of image processing suffer from poor accuracy and failure. For example, some kinds of images may not be well suited for some kinds of image processing. As can be observed from this discussion, systems and methods that improve image processing may be beneficial.

SUMMARY

An electronic device for selecting a transform is described. The electronic device includes at least one image sensor. The electronic device includes a memory. The electronic device also includes a processor coupled to the memory and to the at least one image sensor. The processor is configured to obtain at least two images from the at least one image sensor. The processor is also configured to characterize structural content of each of the at least two images to produce a characterization for each image that is relevant to transform performance. The processor is additionally configured to select at least one transform from a set of transforms based on the characterization. The processor is further configured to apply the at least one transform to at least one of the images to substantially align the at least two images.

The processor may be configured to characterize the structural content by determining one or more metrics that are relevant to transform performance. The processor may be configured to compare the one or more metrics to one or more thresholds.

The set of transforms may be arranged in a hierarchy of transforms. The processor may be configured to select the at least one transform based on the hierarchy. The processor may be configured to determine whether to select the at least one transform proceeding in a hierarchical order, where the hierarchy may be ordered by a number of transform parameters associated with each of the transforms in the set of transforms.

The processor may be configured to characterize the structural content by determining a number of structures, determining a spatial distribution of structures, and/or determining a transform response. The processor may be configured to perform registering, rectifying, and/or warping the at least one of the at least two images based on the transform. The processor may be configured to compute a reprojection error. The processor may be configured to switch between lenses based on the image alignment.

The set of transforms may include a transform including scale, rotation, and x-y shift; a transform including scale and x-y shift; a transform including x-y shift; a transform including x shift; and a transform including y shift. The processor may be configured to select a transform based on a look-up table of application accuracy requirements.

A method for selecting a transform is also described. The method includes obtaining at least two images. The method also includes characterizing structural content of each of the at least two images to produce a characterization for each image that is relevant to transform performance. The method further includes selecting at least one transform from a set of transforms based on the characterization. The method additionally includes applying the at least one transform to at least one of the images to substantially align the at least two images.

A computer-program product for selecting a transform is also described. The computer-program product includes a non-transitory tangible computer-readable medium with instructions. The instructions include code for causing an electronic device to obtain at least two images. The instructions also include code for causing the electronic device to characterize structural content of each of the at least two images to produce a characterization for each image that is relevant to transform performance. The instructions further include code for causing the electronic device to select at least one transform from a set of transforms based on the characterization. The instructions additionally include code for causing the electronic device to apply the at least one transform to at least one of the images to substantially align the at least two images.

An apparatus for selecting a transform is also described. The apparatus includes means for obtaining at least two images. The apparatus also includes means for characterizing structural content of each of the at least two images to produce a characterization for each image that is relevant to transform performance. The apparatus further includes means for selecting at least one transform from a set of transforms based on the characterization. The apparatus additionally includes means for applying the at least one transform to at least one of the images to substantially align the at least two images.

BRIEF DESCRIPTION OF THE DRAWINGS

FIG. 13A illustrates an example of a structure distribution for a Monte-Carlo simulation;

FIG. 13B illustrates an example of a response distribution for the Monte-Carlo simulation;

FIG. 14A illustrates an example of a spatial transformation;

FIG. 14B illustrates an example of a response transformation corresponding to the spatial transformation of FIG. 14A;

DETAILED DESCRIPTION

Some configurations of the systems and methods disclosed herein provide approaches for aligning images. For example, the systems and methods disclosed herein may provide improved image alignment (e.g., stereo rectification) based on image structure characterization.

The performance of an image alignment (e.g., rectification) algorithm depends on the quality of the displacement field from which transformation parameters are estimated. Attempting to estimate a high dimensional transformation from data which is not sufficiently rich in structure may result in catastrophic failure and may thus negatively impact the user application experience.

Alignment (e.g., rectification) algorithms for stereo and video applications may operate in an infinite variety of imaging conditions and scenes. By characterizing image content prior to transform estimation, an improved set (e.g., subset) of transform parameters may be determined. For example, this procedure may match the degrees of freedom in the data to the dimensionality of the transform and thus may enable the improved (e.g., optimum) result to be served to the end user.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
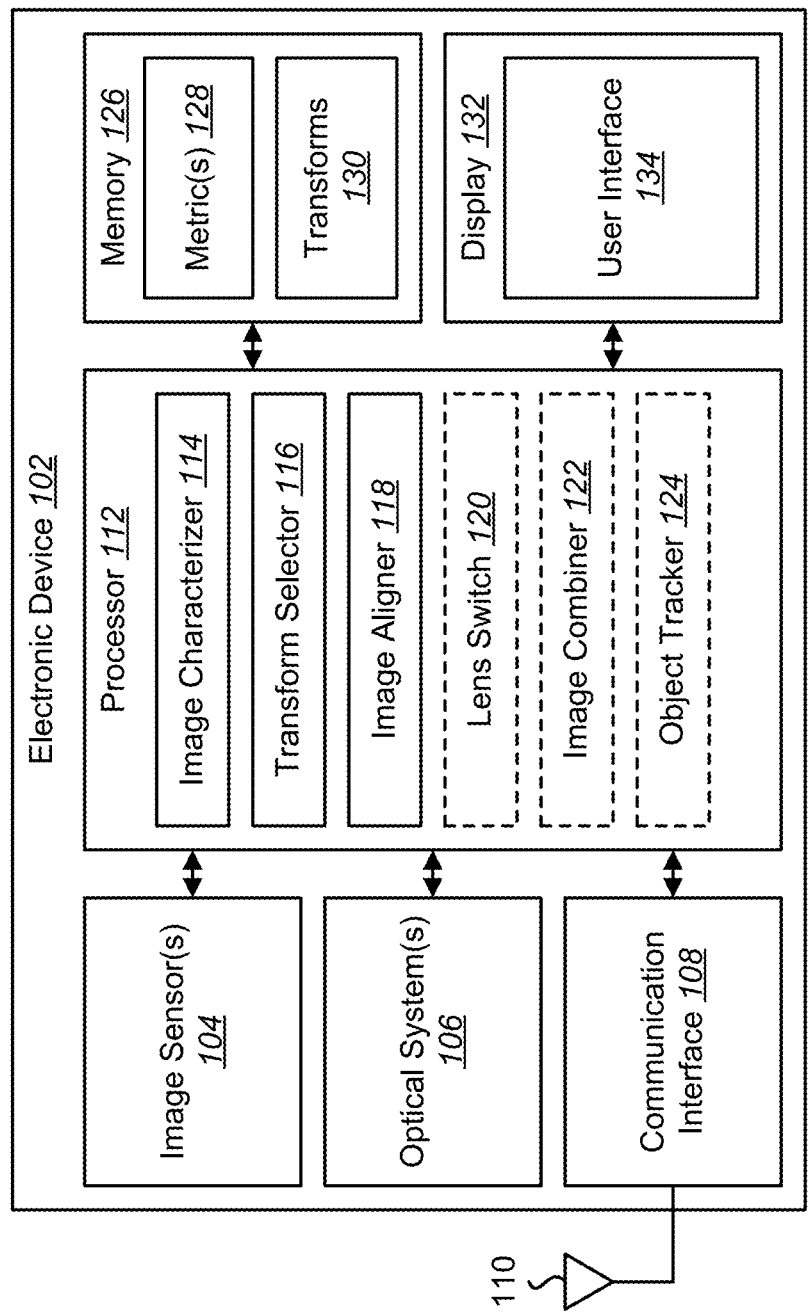
FIG. 1 is a block diagram illustrating one example of an electronic device in which systems and methods for selecting a transform may be implemented.

FIG. 1 is a block diagram illustrating one example of an electronic device 102 in which systems and methods for selecting a transform may be implemented. Examples of the electronic device 102 include cameras, video camcorders, digital cameras, cellular phones, smart phones, computers (e.g., desktop computers, laptop computers, etc.), tablet devices, media players, televisions, automobiles, personal cameras, action cameras, surveillance cameras, mounted cameras, connected cameras, robots, aircraft, drones, unmanned aerial vehicles (UAVs), healthcare equipment, gaming consoles, personal digital assistants (PDAs), set-top boxes, etc. The electronic device 102 may include one or more components or elements. One or more of the components or elements may be implemented in hardware (e.g., circuitry) or a combination of hardware and software (e.g., a processor with instructions).

In some configurations, the electronic device 102 may include a processor 112, a memory 126, a display 132, one or more image sensors 104, one or more optical systems 106, and/or a communication interface 108. The processor 112 may be coupled to (e.g., in electronic communication with) the memory 126, display 132, image sensor 104, optical system 106, and/or communication interface 108. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system 106. Additionally or alternatively, the electronic device 102 may or may not include a display 132. Additionally or alternatively, the electronic device 102 may or may not include a communication interface 108.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface).

The electronic device 102 may obtain one or more images (e.g., digital images, image frames, video, etc.). The one or more images (e.g., frames) may be images of a scene (e.g., one or more objects and/or background). For example, the electronic device 102 may include one or more image sensors 104 and one or more optical systems 106 (e.g., lenses). An optical system 106 may focus images of objects that are located within the field of view of the optical system 106 onto an image sensor 104. In some configurations, the image sensor(s) 104 may capture the one or more images. In some implementations, the electronic device 102 may include multiple optical system(s) 106 and/or multiple image sensors 104. For example, the electronic device 102 may include a wide-angle lens and a telephoto lens in some configurations. The wide-angle lens and telephoto lens may each be paired with separate image sensors 104 in some configurations. Alternatively, the wide-angle lens and the telephoto lens may share the same image sensor 104.

The optical system(s) 106 may be coupled to and/or controlled by the processor 112. Additionally or alternatively, the electronic device 102 may request and/or receive the one or more images from another device (e.g., one or more external image sensors coupled to the electronic device 102, a network server, traffic camera, drop camera, automobile camera, web camera, etc.). In some configurations, the electronic device 102 may request and/or receive the one or more images via the communication interface 108. For example, the electronic device 102 may or may not include a camera (e.g., an image sensor 104 and/or optical system 106) and may receive images from a remote device.

The memory 126 may store instructions and/or data. The processor 112 may access (e.g., read from and/or write to) the memory 126. Examples of instructions and/or data that may be stored by the memory 126 may include image data, one or more transforms 130, one or more metrics 128, features, feature vectors, image characterizer 114 instructions, transform selector 116 instructions, image aligner 118 instructions, lens switch 120 instructions, image combiner instructions 122, object tracker 124 instructions and/or instructions for other elements, etc. In some configurations, the electronic device 102 (e.g., the memory 126) may include an image data buffer (not shown). The image data buffer may buffer (e.g., store) image data (e.g., image frame(s)) from the image sensor 104. The buffered image data may be provided to the processor 112.

In some configurations, the electronic device 102 may include a camera software application and/or a display 132. When the camera application is running, images of scenes and/or objects that are located within the field of view of the optical system 106 may be captured by the image sensor 104. The images that are being captured by the image sensor 104 may be presented on the display 132. In some configurations, these images may be displayed in rapid succession at a relatively high frame rate so that, at any given moment in time, the objects that are located within the field of view of the optical system 106 are presented on the display 132. The one or more images obtained by the electronic device 102 may be one or more video frames and/or one or more still images.

The processor 112 may include and/or implement an image characterizer 114, a transform selector 116, and/or an image aligner 118. The processor 112 may optionally include and/or implement a lens switch 120, an image combiner 122, and/or an object tracker 124 in some configurations. It should be noted that one or more of the elements illustrated in the electronic device 102 and/or processor 112 may be optional. For example, the lens switch 120, the image combiner 122, and/or the object tracker 124 may or may not be included and/or implemented. Additionally or alternatively, one or more of the elements illustrated in the processor 112 may be implemented separately from the processor 112 (e.g., in other circuitry, on another processor, on a separate electronic device, etc.).

Figure 3B:
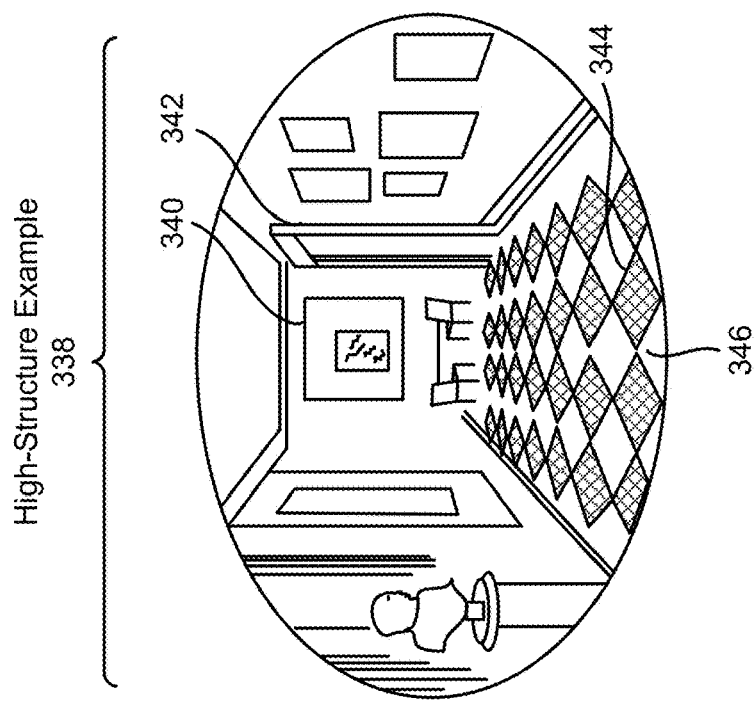
FIG. 3B illustrates an example of an image with a high amount of structure.
Figure 3A:
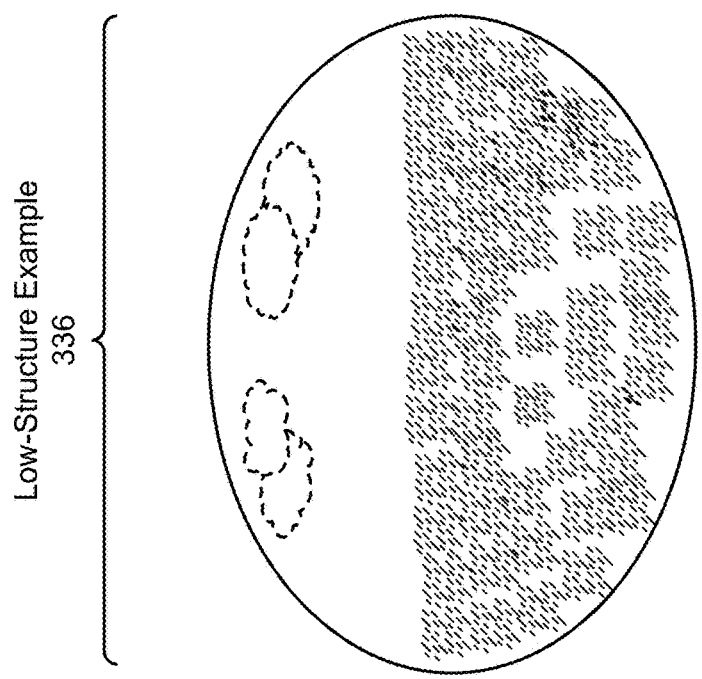
FIG. 3A illustrates an example of an image with a low amount of structure.

The processor 112 may include and/or implement an image characterizer 114. In some configurations, the image characterizer 114 may characterize structural content of the one or more images to produce an image characterization for each image that is relevant to transform performance. For example, different images may exhibit different amounts, distributions, and/or kinds of structural information. For instance, one image may include a large amount of (e.g., "high") structural information. An example of high structural information is an image that contains a number of visible lines (e.g., horizontal, vertical, and/or diagonal edges), that contains a number of visible corners (e.g., an intersection of two or more visible lines or edges), that has a certain spatial distribution of structures, and/or that exhibits a particular transform response. In comparison, another image may include relatively little useful (e.g., "low") structural information. For example, an image with little useful structure information may include relatively few lines and corners. FIG. 3B provides an example of an image with a large amount of structural information and FIG. 3A provides an example of an image with relatively little useful structural information. It should be noted that each image characterization (e.g., metric) may correspond to a single image in some approaches or each image characterization (e.g., metric) may correspond to a set of multiple images in other approaches.

In some configurations, the image characterizer 114 may determine one or more metrics in order to characterize the one or more images. For example, the electronic device 102 may determine a set of keypoints for an image. The electronic device 102 may count the number of keypoints to determine a number of keypoints metric. Additionally or alternatively, the electronic device 102 may determine a distribution of the keypoints. For example, the electronic device 102 may determine a measure (e.g., histogram) of how concentrated the keypoints are. Numbers and/or distributions of other structures (e.g., corners, lines, etc.) may be determined. The electronic device 102 may determine a transform response of the one or more images. For example, the electronic device 102 may determine a cross-correlation between a region of a first image and a region of a second image. The transform response may indicate one or more types of structures (e.g., corners, horizontal lines, vertical lines, diagonal lines, etc.). The number(s) and/or type(s) of structures in an image may be detected based on the transform response.

A transform may be an operation that maps one image to another image. For example, a transform may translate, scale, rotate, and/or change (e.g., deform) one image to align the image to another image. In other words, a transform may be utilized for modeling input data (e.g., images) and/or may be utilized as a function to modify input data. Each transform may include one or more parameters (e.g., coefficients) that determine the transform. Examples of parameters may include a translation in a dimension (e.g., an x shift, a horizontal shift, a y shift, a vertical shift, etc.), a translation in multiple dimensions (e.g., an x-y shift, etc.), a rotation, a scale, etc. A set of transforms may be a group of two or more transforms. In some configurations, each transform in the set differs from another transform in the set in the number and/or type of parameters included in the transform. Table 1 illustrates an example of different types of transforms and their accompanying parameters.

TABLE 1

| Transform | Parameter(s) |
| --- | --- |
| X Translation (e.g., Horizontal Translation) | X Translation (e.g., X Shift) |
| Y Translation (e.g., Vertical Translation) | Y Translation (e.g., Y Shift) |

TABLE 1-continued

| Transform | Parameter(s) |
| --- | --- |
| Two-Dimensional (2D) Translation | X Translation, Y Translation (e.g., X-Y Shift) |
| Isotropic Scale | X Translation, Y Translation, One-Dimensional (1D) Scaling |
| Anisotropic Scale | X Translation, Y Translation, 2D Scaling |
| Similarity (e.g., Euclidean) | X Translation, Y Translation, 1D Scaling, Rotation |
| Affine | Rotation in a First Angle, X Translation, Y Translation, 2D Scaling, Rotation in a Second Angle |
| Projective | Rotation in a First Angle, X Translation, Y Translation, 2D Scaling, Rotation in a Second Angle, Two Position-Dependent Mapping Parameters |

It should be noted that different transforms may be referred to in terms of their parameters. For example, a 2D translation transform may be referred to as an X-Y shift transform. It should also be noted that some transforms may be referred to as sub-transforms relative to another transform. For example, an isotropic scale transform may be a sub-transform of the anisotropic scale transform, since the isotropic scale transform includes a subset of the parameters of the anisotropic scale transform.

The image characterization may be relevant to transform performance. For example, transform performance may depend on the content of an image. In particular, transforms that employ a larger number of parameters (e.g., higher-dimensional transforms) may perform better for images with a greater amount of structural information. In some cases, transforms that employ a larger number of parameters may perform poorly or may even fail for images with less structural information. For example, transform performance may depend on the structural content of the image (e.g., some transforms may perform well for images with high structural information but may not perform well for images with low structural information). Accordingly, the systems and methods disclosed herein may select one or more transforms based on the image structure characterization, which may indicate and/or quantify the structural content of an image.

In some configurations, characterizing the structure of an image may include determining one or more metrics that are relevant to transform performance. Examples of metrics that may characterize the structure of an image may include a number of structures, a distribution (e.g., spatial distribution) of structures, a ratio between numbers of different structure types, a transform response (e.g., a cross-correlation of a region in a first image with a region in a second image), etc. In some configurations, the characterization may include one or more metrics that quantify indicia of absolute or relative structure.

Examples of one or more metrics that may be included in the characterization are given as follows. In some configurations, the image characterizer 114 may extract one or more keypoints from the image(s). The number of keypoints may be counted as a number of structures metric in some approaches. Additionally or alternatively, a number of lines (e.g., edges) and/or corners may be counted as a number of structures metric. In some configurations, the spatial distribution of one or more features (e.g., keypoints, lines, corners, etc.) may be measured. For example, a distribution metric may indicate how spread out and/or concentrated the features (e.g., keypoints, lines, corners, etc.) are over one or more dimensions of the image. Additionally or alternatively, a transform response metric may indicate a degree of cross-correlation between regions of the two images. One or more of these metrics may provide a quantization of the structure of an image.

The processor 112 may include and/or implement a transform selector 116. The transform selector 116 may select a transform from a set of transforms based on the characterization. For example, the transform selector 116 may select a transform for the image(s) based on the structural content of the image(s). In some configurations, selecting the transform may include comparing one or more metrics (e.g., characterization metrics) to one or more thresholds. For example, the threshold(s) may provide a decision rule for selecting a transform that tends to perform accurately for images with similar and/or comparable amounts of structure. In some configurations, the set of transforms (e.g., transforms 130) may be arranged in a hierarchy of transforms. Selecting the transform may be based on the hierarchy. For example, the transform selector 116 may select a transform proceeding in hierarchical order, where the hierarchy may be ordered by a number of transform parameters associated with each of the transforms in the set of transforms. More detail is provided in connection with one or more of FIGS. 9-12.

The processor 112 may include and/or implement an image aligner 118. The image aligner 118 may substantially align (e.g., match the viewpoints of) at least two images based on the transform. In particular, the image aligner 118 may apply at least one transform to at least one of the images to substantially align the images (e.g., two or more images). For example, the transform may indicate a relationship (e.g., mapping) between two images. For instance, the transform may indicate one or more of translation, scale, rotation, and/or other change (e.g., deformation) between images. In some configurations, the image aligner 118 may register, rectify, align, and/or warp one or more images based on the transform. For example, image aligning may include spatially aligning the images such that the images appear to be taken from the same camera pose. In some configurations, for example, the electronic device 102 (e.g., processor 112) may perform interpolative mapping (e.g. bilinear or bicubic interpolative mapping) between corresponding pixels in each image.

Performing good spatial matching may be a result and benefit of selecting a transform with good performance (e.g., an "optimum" transform). For example, as the alignment in space between the images improves, the alignment in intensity (e.g., photometric) also improves. Accordingly, selecting a transform that performs well (e.g., an "optimum" transform) from the available hierarchy based on the image structure characterization (e.g., image structure metrics, cues, etc.) may be advantageous in multi-image (e.g., stereo-image) systems. In some approaches, the electronic device 102 may additionally compute a reprojection error. For example, the reprojection error may be computed in order to check transform performance.

In some configurations, the electronic device 102 may perform one or more additional operations based on the image alignment. In one example, the processor 112 may include and/or implement a lens switch 120. The lens switch 120 may switch between lenses (e.g., optical systems 106) based on the image alignment. For instance, the electronic device 102 may include multiple lenses and/or cameras (e.g., a wide-angle lens and a telephoto lens, a wide-angle camera and a telephoto camera). Additionally or alternatively, the electronic device 102 may be coupled to multiple lenses (e.g., a remote wide-angle camera and/or a remote telephoto camera). As an image from a wide-angle lens (e.g., wide-angle camera) is being zoomed in, the electronic device 102 may switch to a telephoto lens (e.g., telephoto camera) when the zoom reaches a particular point. The image alignment may allow a smooth transition between the lenses. For example, the better the transform performance, the better the image alignment and the more seamless the transition from wide-angle lens to telephoto lens.

In another example, the processor 112 may include and/or implement an image combiner 122. The image combiner 122 may combine (e.g., fuse, stitch, etc.) images to form a combined image. For example, the image aligner 118 may align overlapping areas of images based on the selected transform(s). The images may then be combined by stitching the images along a seam and/or discarding extra image data. Additionally or alternatively, the image combiner 122 may stack images (e.g., combine multiple images of the same scene to improve signal-to-noise ratio).

In yet another example, the processor 112 may include and/or implement an object tracker 124. The object tracker 124 may track one or more objects between different images and/or cameras.

Figure 16:
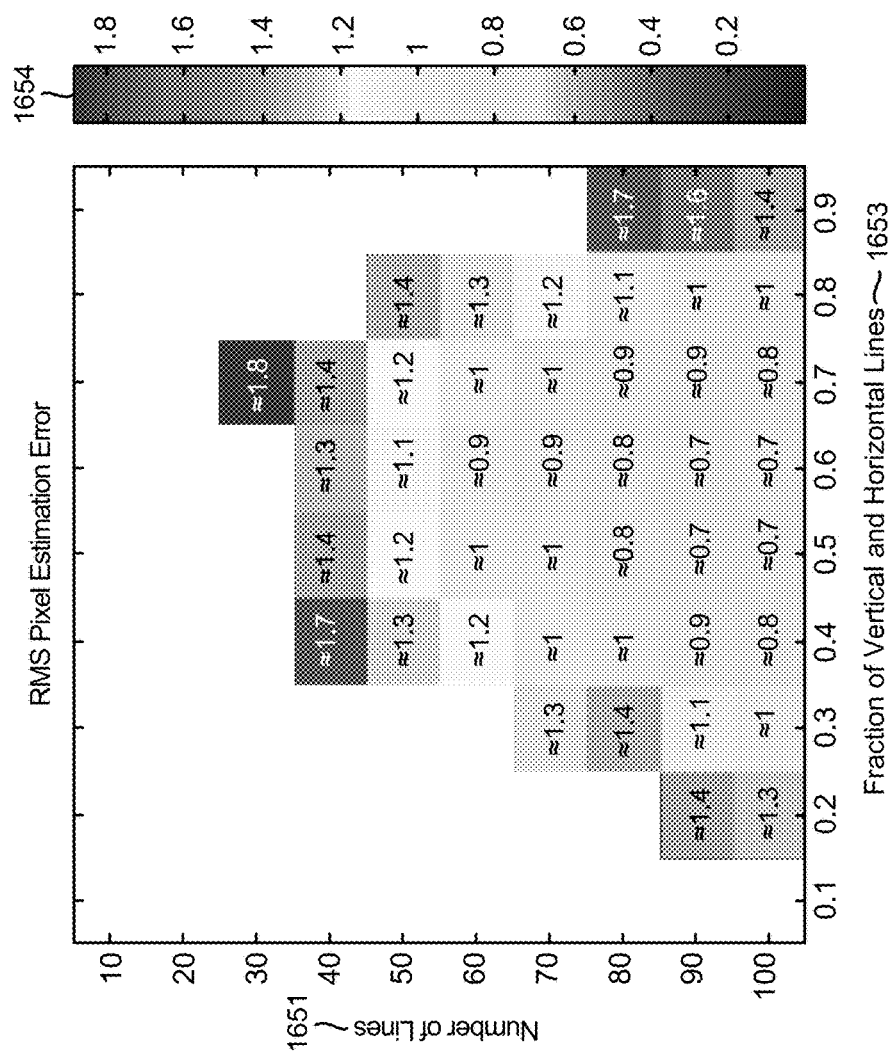
FIG. 16 depicts a plot that illustrates a parameter estimation envelope.

In some configurations, selecting the transform may be based on the target application. For example, some applications may perform better when a particular transform is selected. Accordingly, the transform may be selected based on the image structure characterization and the target application (e.g., lens switching, image combining, object tracking, etc.) in some configurations. For example, different applications may require different accuracies and/or latencies. Once the image structure is characterized, in some implementations, a transform (e.g., an optimum transform) may be selected based on a predetermined (e.g., precomputed) look-up table based on one or more application requirements (e.g., accuracy, latency, etc.). The electronic device 102 may store the look-up table in memory 126. For example, the look-up table may indicate a set of applications with corresponding accuracy requirements. The electronic device 102 (e.g., processor 112) may select a transform that meets or exceeds the requirements for the application. For example, some applications may tolerate higher errors. In some approaches, the electronic device 102 may select a simpler transform to increase speed and/or efficiency at the cost of less accuracy for an application that can tolerate higher errors. Alternatively, the electronic device 102 may select a more complex transform to increase accuracy at the cost of speed and/or efficiency for an application that requires a higher accuracy. FIG. 16 illustrates an example of the frontier of performance vs. acceptable error. For instance, the accuracy (or error, for example) required for an application may depend on latency, resolution and/or type of processing, etc.

One or more other applications may be performed by the electronic device 102 in some configurations. For example, the processor 112 may optionally include and/or implement an auto-focuser, which may operate based on the transform and/or aligned image. In another example, the processor 112 may optionally include and/or implement a depth mapper, which may operate based on the transform and/or aligned image.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example).

Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to a mouse and may detect a mouse click.

The systems and methods disclosed herein may provide an improved user experience. For example, the systems and methods disclosed herein may flatten the operating envelope and may prevent a transform failure (e.g., providing an incorrect and/or inaccurate mapping between images). For example, the operating envelope may be flattened in the sense of more uniform (lower variance) performance and user experience. Because a suitable transform (e.g., an "optimum" set of parameters) may be estimated, the presentation to the user may reliably result in good performance, as opposed to serving a substandard result due to over-aggressive parameter estimation. The systems and methods disclosed herein may also be adaptive and may help to select a best available transform based on the current image(s).

In some configurations, the systems and methods disclosed herein may enable adaptive transform selection. The transform selection may be adapted to the images (e.g., input images). For example, selecting a transform based on an image characterization may be viewed as adapting a transform to the data. This may be different from adapting the data to a transform (e.g., a fixed transform). For instance, some approaches may employ outlier rejection and/or data filtering in an effort to enable a transform to perform better. These approaches may differ in that the data is changed (e.g., filtered) in order to suit a transform, whereas some configurations of the systems and methods disclosed herein may change the transform itself to suit the data. Accordingly, the systems and methods disclosed herein may be advantageous since they can function (e.g., perform well), even with a wide variety of different input images. However, other approaches that merely filter data may fail when none of the data allows the transform to perform well (e.g., when the image structure does not support good transform performance). It should be noted, however, that data filtering may be implemented in addition to adaptive transform selection in some configurations.

The systems and methods disclosed herein may provide transform selection that is adaptive, dynamic, switchable, and/or real-time. For example, the systems and methods disclosed herein may allow for the transform (e.g., transform parameters) to be switched and/or adapted based on the current images. For example, some configurations of the systems and methods disclosed herein may be implemented in the context of a series of images (e.g., image frames, video, etc.). Accordingly, the transform that is selected for one image (e.g., for a pair of images) may be different from a transform that is selected for another image in a series of images. For instance, assume that a user is shooting video of a building that exhibits a lot of structural information with the electronic device 102 and then turns the electronic device 102 to capture video of a field that exhibits very little structural information. The electronic device 102 may adaptively switch the transform that is being used to better suit the video of the field. The adaptiveness of some configurations of the systems and methods disclosed herein may accordingly provide flexibility in providing good transform performance for a wide variety of images.

In some configurations, the image characterization and/or transform selection may be performed in real-time. For example, the electronic device 102 may characterize images and select a transform according to the image characterization in real-time. This may allow real-time transform adaptation as the structural information in captured images changes (from frame-to-frame, for example).

Figure 2:
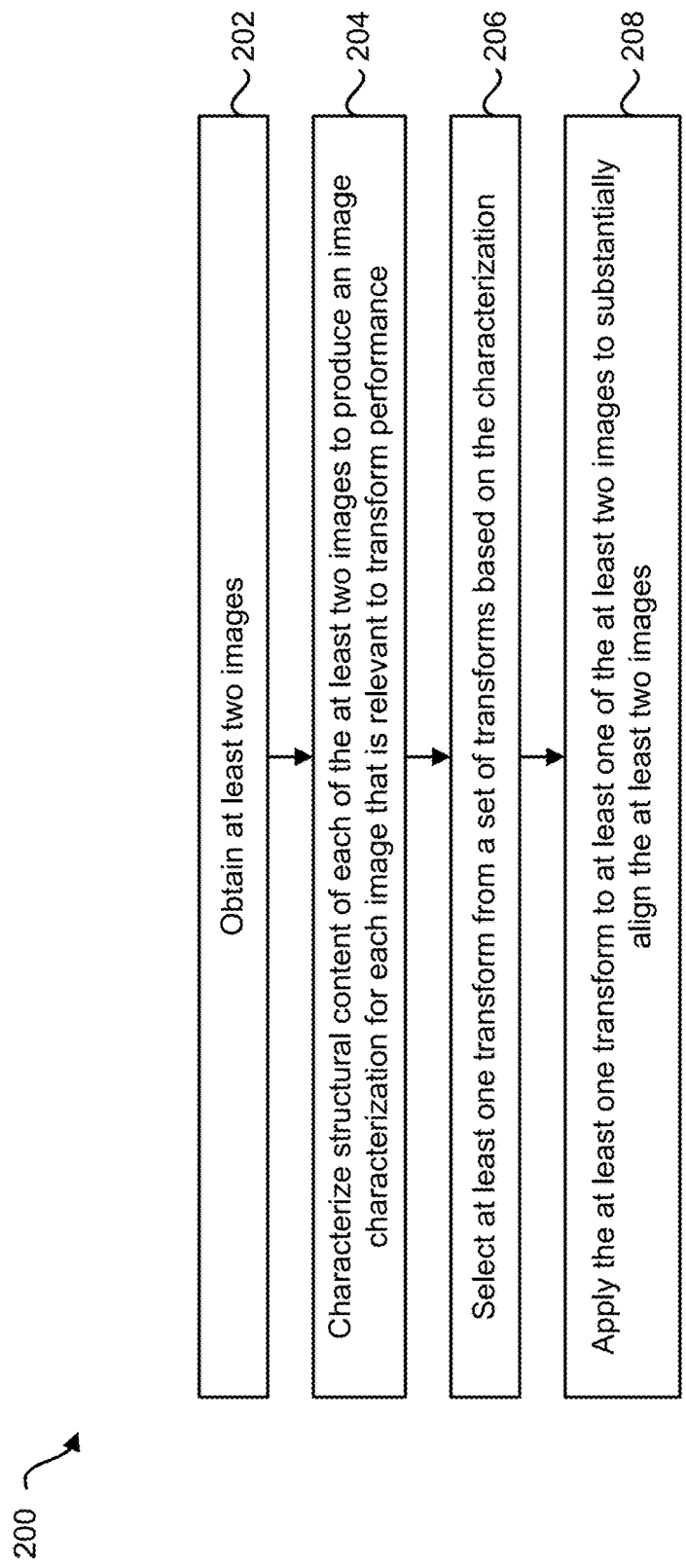
FIG. 2 is a flow diagram illustrating one configuration of a method for selecting a transform.

FIG. 2 is a flow diagram illustrating one configuration of a method 200 for selecting a transform. The method 200 may be performed by the electronic device 102, for example.

The electronic device 102 may obtain 202 two or more images (e.g., one or more frames) of a scene. This may be accomplished as described above in connection with FIG. 1. In some configurations, the two or more images may come from separate lenses and/or image sensors. For example, one image may be obtained from a wide-angle lens and another image may be obtained from a telephoto lens. Additionally or alternatively, the two or more images may come from the same lens and/or image sensor. For example, two images may be captured at different time instances from the same lens and/or image sensor.

The electronic device 102 may characterize 204 structural content of each of the at least two images to produce an image characterization for each image that is relevant to transform performance. This may be accomplished as described above in connection with FIG. 1. For example, the electronic device 102 may produce a first image characterization for a first image and may produce a second image characterization for a second image. Each image characterization may include (or be associated with, for example) one or more metrics (e.g., number of structures, types of structures, structure distribution, transform response, etc.).

The electronic device 102 may select 206 at least one transform from a set of transforms based on the characterization(s). This may be accomplished as described above in connection with FIG. 1. For example, the electronic device 102 may select 206 one or more transforms indicated by one or more metrics of the characterization(s). In some configurations, the selection 206 may be based on a decision rule, one or more thresholds, and/or a mapping from the metric(s) to the one or more transforms.

The electronic device 102 may apply 208 the at least one transform to at least one of the at least two images to substantially align the at least two images. This may be accomplished as described above in connection with FIG. 1. For example, the electronic device 102 may apply the selected transform(s) to one or more of the images to substantially align the images. For example, applying the transform(s) may provide estimates of one or more parameters that align one image with the other image. For example, applying the transform(s) may provide a horizontal translation, a vertical translation, scaling in one or more dimensions, and/or one or more rotations that align one image with the other image. Aligning the images may match the viewpoints of the images.

It should be noted that different orders of operation may be implemented in different configurations. In one example, the electronic device 102 may select all transform(s) and then apply all transform(s) to the images. In another example, the electronic device 102 may select one or more transforms and then may apply the selected transform(s). The electronic device 102 may then identify (e.g., select) one or more additional transforms and may apply the additional transform(s). In yet another example, the electronic device 102 may select one or more transforms and then apply the selected transform(s). The electronic device may then re-characterize one or more images, may identify (e.g., select) one or more additional transforms and apply the additional transform(s).

In some configurations, the electronic device 102 may apply the image alignment. For example, the electronic device 102 may switch lenses, combine images, and/or track object(s) as described in connection with FIG. 1.

FIG. 3A illustrates an example 336 of an image with a low amount of structure and FIG. 3B illustrates an example 338 of an image with a high amount of structure. As described above, image alignment may be based on image structure. The quality (e.g., character) of image structure may be utilized to select a transform (with an algorithm complexity, for instance). As discussed above, transform performance may depend on the structural content of the image (e.g., some transforms may perform well for images with high structural information but may not perform well for images with low structural information). The systems and methods disclosed herein may match a transform (e.g., algorithm) to an image. Transform performance may affect the performance of one or more applications (e.g., lens switching, tracking, image fusion, etc.). For example, if a transform provides an image alignment with a large amount of error, one or more application of the transform (and/or image alignment) may fail or suffer degraded performance. Some aspects of image structure characterization and/or metrics of image structure may include a spatial response, structure pervasiveness, and/or spatial distribution.

As illustrated in FIG. 3B, the high-structure example 338 includes a large amount of structural content (e.g., structural features). For example, the image in FIG. 3B includes many horizontal lines 340, vertical lines 342, diagonal lines 344, and corners 346. In some configurations, keypoints may be assigned to one or more features (e.g., corners, lines, etc.). The image in FIG. 3B also illustrates an example of widely distributed structure. For example, the structural features in the image are distributed throughout the image (and are not concentrated in only one area, for instance). Accordingly, transforms with many parameters and/or dimensions may perform well on the image illustrated in FIG. 3B.

In contrast, the low-structure example 336 in FIG. 3A includes much less structural content. For example, the image largely includes textures with very few well defined lines and corners. Accordingly, some transforms may not perform well when applied to such an image.

Figure 4:
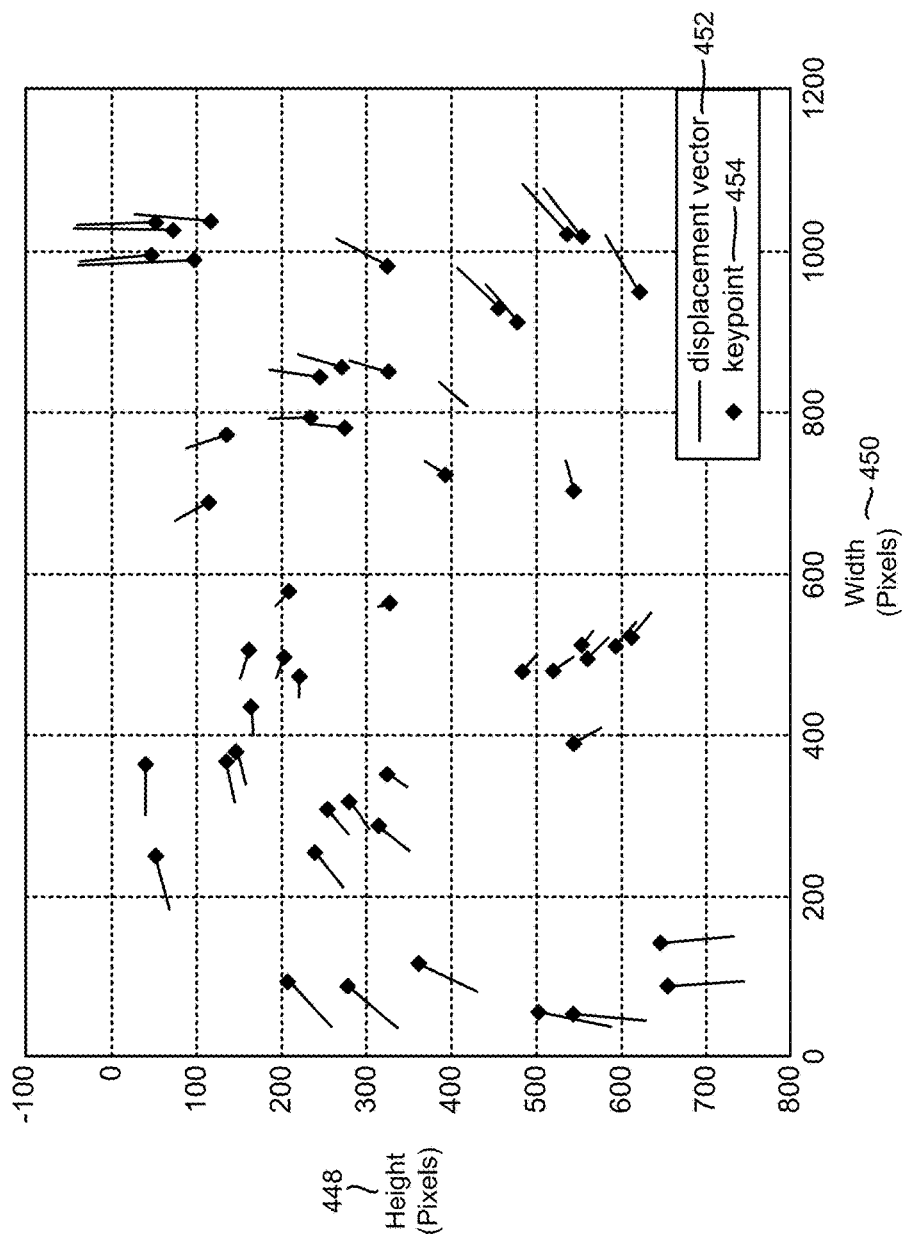
FIG. 4 illustrates an example of a displacement field of keypoints from a first image to a second image.

FIG. 4 illustrates an example of a displacement field of keypoints 454 from a first image to a second image. Specifically, FIG. 4 illustrates a plot of keypoints 454 with accompanying displacement vectors 452. The plot is illustrated in height (pixels) 448 over width (pixels) 450. The displacement vectors 452 indicate the displacement of a keypoint from the first image to the second image.

Transform parameter estimation may be performed based on interpolating the displacement field. Some factors that may affect parameter estimation accuracy may include sensitivity, spatial dependence, field dimensionality, number of structures, and/or quality of structures. Without enough structural content, higher-dimensional transforms may fail. Additionally or alternatively, some transforms may not accurately express the transformation from one image to another. For example, the translation transform may fail to capture image rotation as illustrated in FIG. 4. As described above, a transform may be selected based on the characterization of the image(s).

Figure 5:
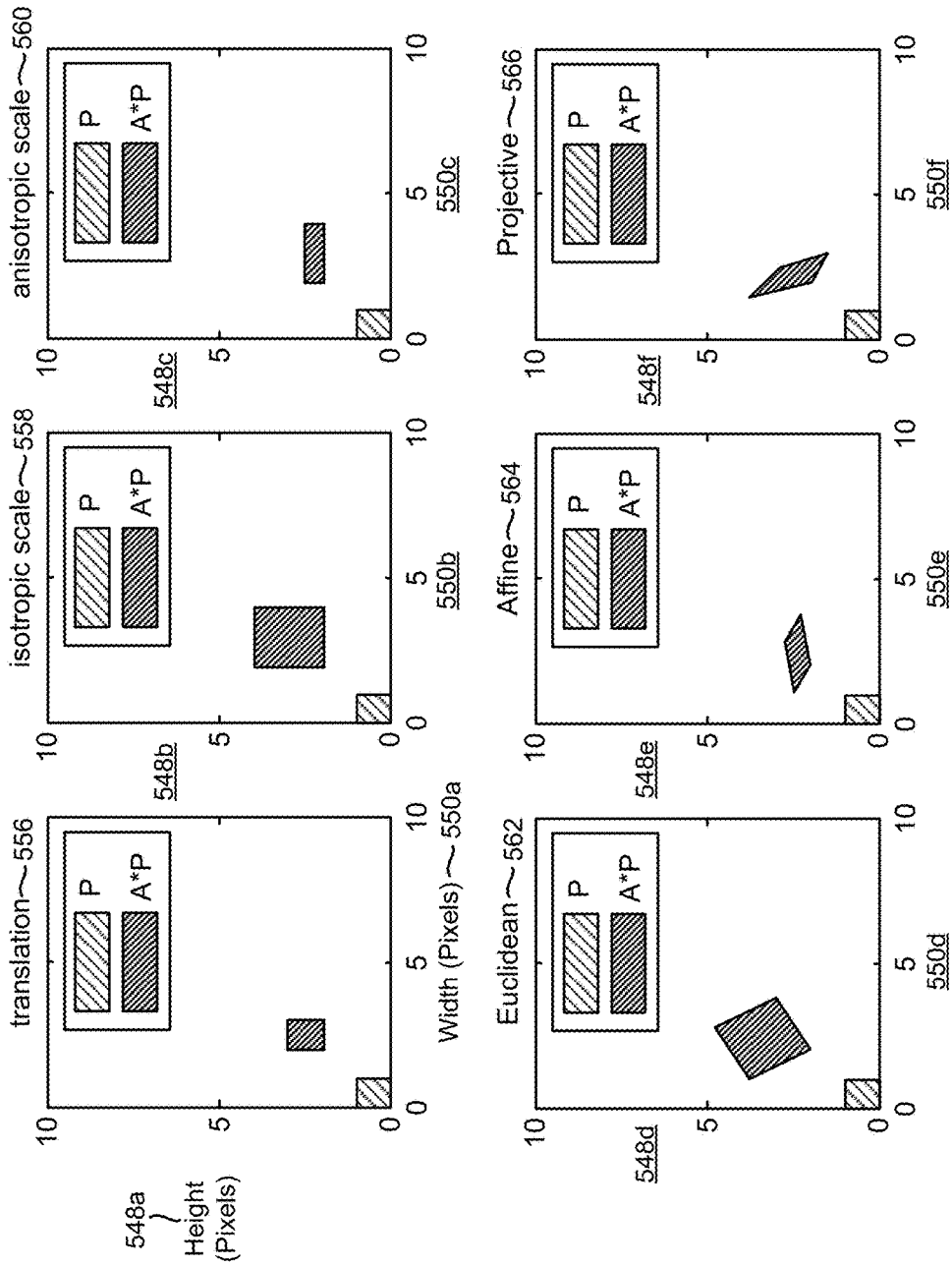
FIG. 5 is a diagram illustrating examples of two-dimensional (2D) spatial transformations.

FIG. 5 is a diagram illustrating examples of two-dimensional (2D) spatial transformations. In particular, FIG. 5 illustrates examples of a translation transform 556, an isotropic scale transform 558, an anisotropic scale transform 560, a similarity (or Euclidean) transform 562, an affine transform 564, and a projective transform 566. Each of the transforms is illustrated on a separate graph in height (pixels) 548*a-f* over width (pixels) 550*a-f*. One or more of the 2D spatial transformations described herein may be examples of transforms in a set of transforms as described above in connection with FIG. 1.

As discussed above, the systems and methods disclosed herein may have a number of transforms (e.g., a set of transforms) available to select from. In some configurations, the set of transforms may include one or more of the translation, isotropic scale, anisotropic scale, similarity, affine, and projective transforms. One or more of the transforms may be utilized to align, register, correct, rectify (e.g., digitally align camera viewpoints), etc., two or more images. For example, transforms may align images with spatial differences (e.g., images taken with stereo cameras) and/or with temporal differences (e.g., images taken over time with the same camera, such as video). Table 2 illustrates a taxonomy of transforms according to a number of parameters utilized by the corresponding transform.

TABLE 2

|  | Translation | Isotropic Scale | Anisotropic Scale | Similarity | Affine | Projective |
| --- | --- | --- | --- | --- | --- | --- |
| Parameters | 2 | 3 | 4 | 4 | 6 | 8 |

Each transform may utilize one or more parameters. The parameters may express the transform between two images. For example, a two-dimensional (2D) translation transform may include an x translation parameter and a y translation parameter. These parameters may indicate the transform (in terms of x translation and y translation) from a location in a first image to a location in a second image. In some configurations, a translation transform may utilize 2 parameters (e.g., x translation and y translation), an isotropic scale transform may utilize 3 parameters (e.g., x translation and y translation with scaling in one dimension), an anisotropic scale transform may utilize 4 parameters (e.g., x translation and y translation with scaling in two dimensions), a similarity transform (or Euclidean transform, for example) may utilize 4 parameters (e.g., x translation, y translation, scaling in one dimension, and a rotation), an affine transform may utilize 6 parameters (e.g., rotation in one angle, x translation, y translation, scaling in two dimensions, and a rotation in another angle), and a projective transform may utilize 8 parameters (e.g., rotation in one angle, x translation, y translation, scaling in two dimensions, a rotation in another angle and two additional parameters that cause a position-dependent mapping). When an image does not include enough structural content or information to accurately estimate one or more transform parameters, the resulting transform may fail.

These transforms may be arranged in order of complexity (e.g., hierarchically). Examples of these transforms are illustrated in FIG. 5. Specifically, each of the transform plots illustrate a unit square at 0, 0. The other shape in each transform plot illustrates the unit square having undergone the transform.

Figure 6:
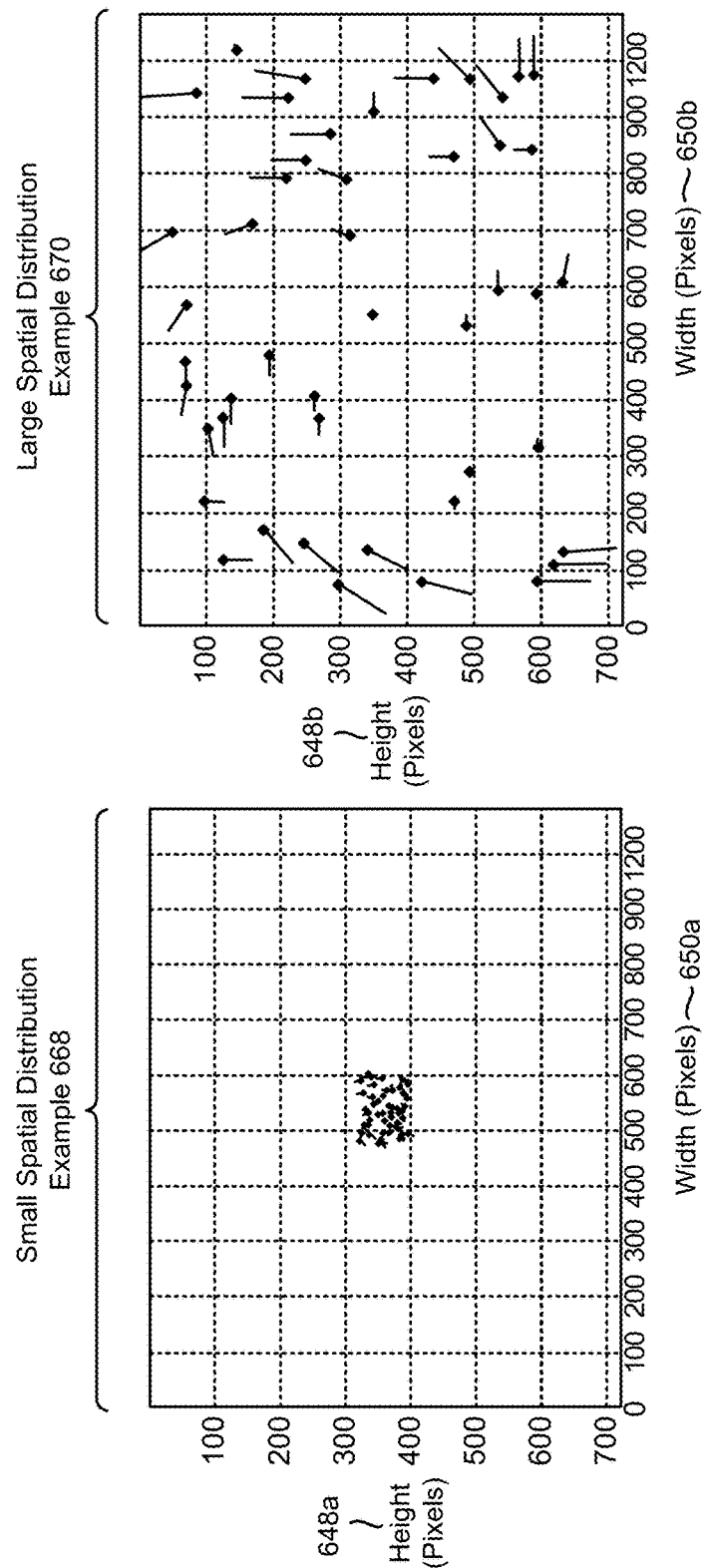
FIG. 6 includes plots that illustrate spatial structure distributions.

FIG. 6 includes plots that illustrate spatial structure distributions. Each of the plots is illustrated on a separate graph in height (pixels) 648*a-b* over width (pixels) 650*a-b*. An image may have an insufficient spatial distribution to permit full parameter set estimation in some cases. In these cases, estimating a full parameter set (e.g., applying a high-dimension transform) may yield an error (e.g., a transform failure). For example, the small spatial distribution example 668 illustrates a displacement field of keypoints that have a small spatial distribution (e.g., "center only"), while the large spatial distribution example 670 illustrates a displacement field of keypoints that have a larger spatial distribution (e.g., that are "uniformly distributed" within the image). In cases where there is insufficient information for full parameter set estimation, estimation of a subset of parameters may be beneficial, for example.

Figure 7:
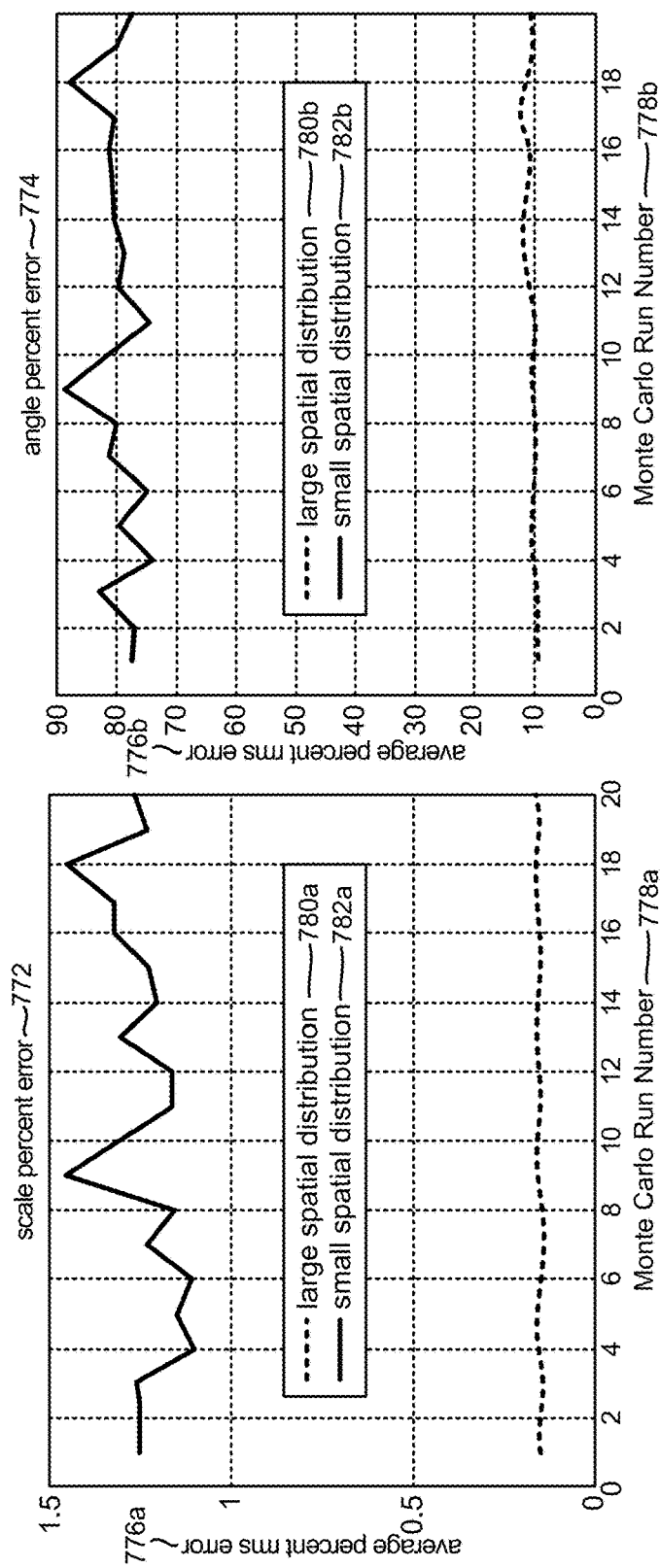
FIG. 7 includes plots that illustrate a scale percent error and an angle percent error corresponding to the examples described in connection with FIG. 6.

FIG. 7 includes plots that illustrate a scale percent error 772 and an angle percent error 774 corresponding to the examples 668, 670 described in connection with FIG. 6. Each of the plots is illustrated on a separate graph in average percent root mean squared (RMS) error 776*a-b* over Monte Carlo run number 778*a-b*.

As illustrated in FIG. 7, the scale percent error 772 and the angle percent error 774 may be very high when structures have an insufficient spatial distribution for estimation of a full parameter set (e.g., for application of a high-dimension transform) as illustrated by the small spatial distribution example 668 described in connection with FIG. 6. For example, the scale percent error 772 is between 1 and 1.5 percent and the angle percent error 774 is between 70 and 90 percent for the small spatial distribution 782*a-b* (e.g., "center only") example (e.g., from the small spatial distribution example 668 in FIG. 6). However, when structures have a sufficient spatial distribution, the scale percent error and the angle percent error are much lower. For example, the scale percent error 772 is between 0 and 0.5 percent and the angle percent error 774 is approximately 10 percent for the large spatial distribution 780*a-b* (e.g., "uniformly distributed") example (e.g., from the large spatial distribution example 670 in FIG. 6). Accordingly, spatial distribution may be one metric that may be utilized to determine how complex an effective transform may be (e.g., to determine a number of parameters that may be accurately estimated).

Figure 8B:
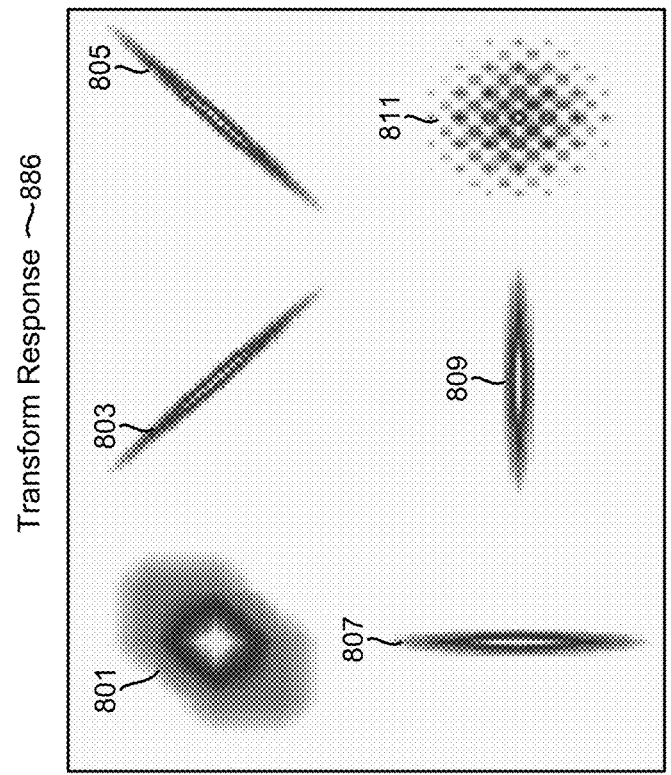
FIG. 8B illustrates examples of transform responses corresponding to the spatial structures in FIG. 8A.
Figure 8A:
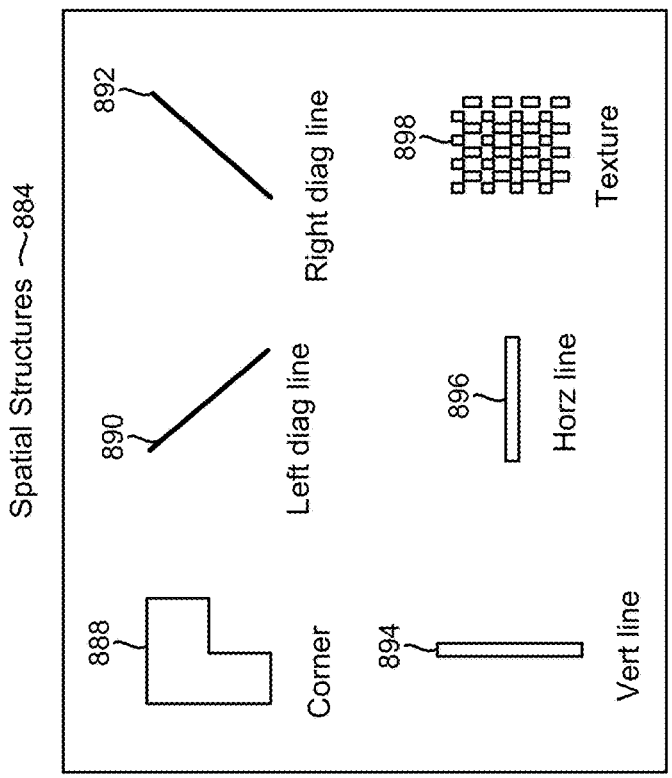
FIG. 8A illustrates simulated examples of spatial structures.

FIG. 8A illustrates simulated examples of spatial structures 884 (e.g., spatial signatures). For example, some typical image structures may include corners 888, left diagonal lines 890, right diagonal lines 892, vertical lines 894, horizontal lines 896, and/or texture 898.

FIG. 8B illustrates examples of transform responses 886 corresponding to the spatial structures in FIG. 8A. For example, corners 888 may have a concentrated spatial response 801. Vertical lines 894 may exhibit a response along a vertical axis 807 and may offer good matching performance along the horizontal axis (e.g., good horizontal transformation parameter estimation). Horizontal lines 896 may exhibit a response along a horizontal axis 809 and may offer good matching performance along the vertical axis (e.g., good vertical transformation parameter estimation). Left diagonal lines 890 may exhibit a left diagonal response 803 and right diagonal lines 892 may exhibit a right diagonal response 805. Although illustrated as patterned for convenience in FIG. 8A, texture 898 may be described as randomly distributed patterns. Texture may provide high peaks and spurious peaks in a texture response 811. Accordingly, texture regions may not provide a good region for gauging a transformation.

Figure 9:
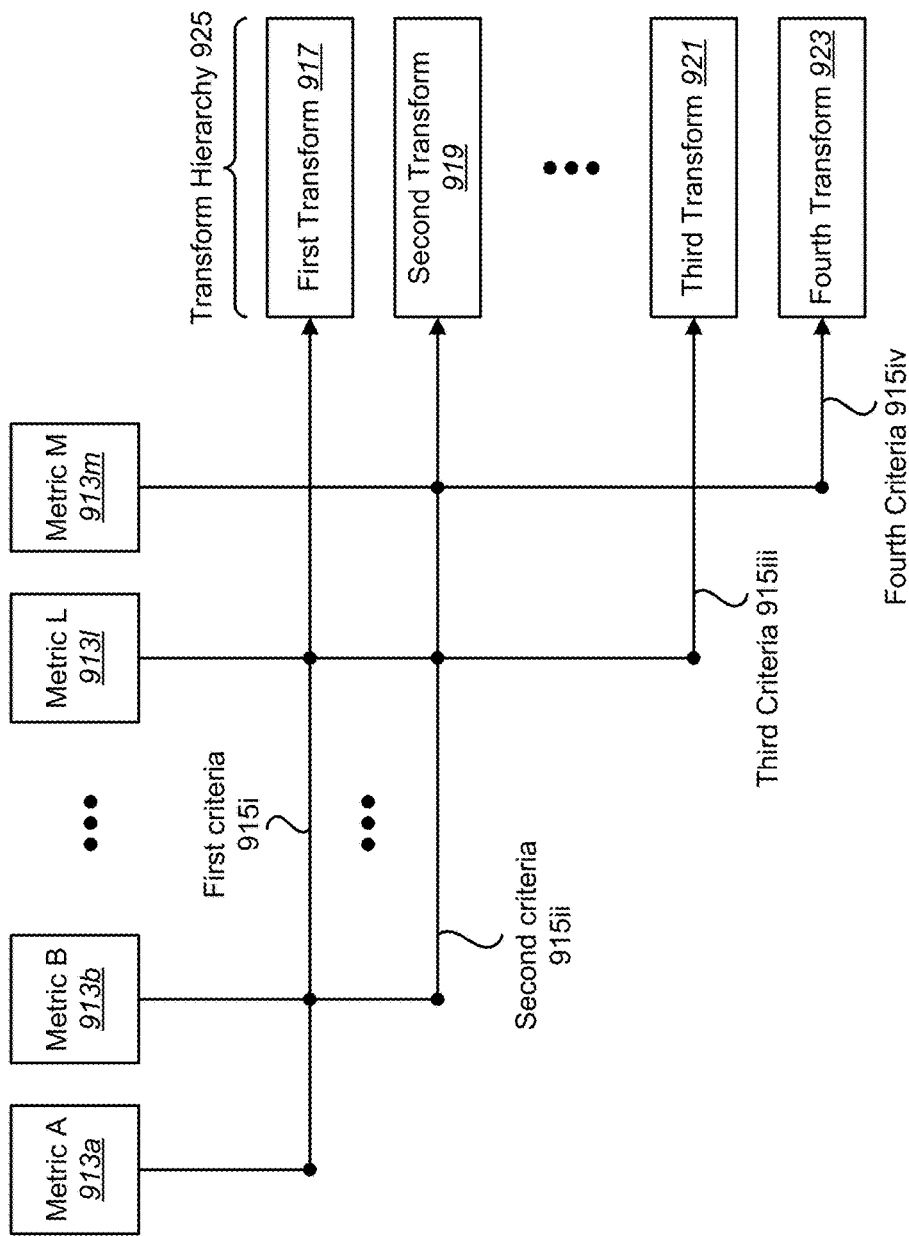
FIG. 9 is a diagram illustrating one example of a transform set.

FIG. 9 is a diagram illustrating one example of a transform set 925. In some configurations, a transform set 925 may be arranged in a transform hierarchy. In general, a transform hierarchy may be an arrangement (e.g., ordering, ranking, etc.) of transforms. In some configurations, transforms may be arranged (e.g., ordered, ranked) in accordance with a number of parameters that are estimated in the transform. For example, transforms may be ordered in descending order, where a transform having a largest number of parameters (e.g., a most complex transform) in a set of transforms may have a highest rank, while a transform having a smallest number of parameters (e.g., a simplest transform) in the set of transforms may have a lowest rank. In the example illustrated in FIG. 9, the transform set 925 may be arranged in a transform hierarchy that has a first transform 917 with a highest rank, while the second transform 919, third transform 921, and fourth transform 923 are ordered in descending order. While four transforms 917, 919, 921, 923 are illustrated in FIG. 9, it should be noted that two or more transforms may be utilized in accordance with the systems and methods disclosed herein.

As described herein, one or more transforms may be selected based on a characterization of each of two or more images. In some configurations, a characterization may be expressed as one or more metrics. Accordingly, one or more transforms may be selected based on one or more metrics. In some approaches, the selection may be based on a transform hierarchy.

In the example illustrated in FIG. 9, multiple metrics 913a-m are illustrated. While four metrics 913a-m are illustrated in FIG. 9, it should be noted that one or more metrics may be utilized in accordance with the systems and methods disclosed herein. It should also be noted that there may or may not be the same number of metrics as number of transforms.

In some configurations, one or more transforms may be selected based on one or more metrics in accordance with one or more criteria. The criteria may be one or more conditions to be met in order for a corresponding transform to be selected. For example, if the metric(s) meet the one or more criteria (e.g., each criterion or condition of the criteria), then the electronic device 102 may select a transform corresponding to the criteria. Examples of criteria may include thresholds, decision rules, ranges, regions, matching values, etc. An example of criteria may include one or more thresholds, where each metric corresponding to the criteria is compared to a threshold to determine whether the threshold is met. Another example of criteria may include a decision rule. A decision rule may be a single or multi-dimensional space with two or more ranges or regions. Each of the ranges or regions may correspond to a transform. The electronic device 102 may select the transform corresponding to the range or region of the decision rule in which the one or more metrics are located (e.g., a metric vector is located).

In some configurations, the criteria (e.g., threshold(s), decision rule(s), range(s), region(s), matching value(s), etc.) may be trained (e.g., trained offline, pre-trained, etc.) based on a plurality of images (e.g., predetermined images) and accuracy (e.g., error rate, accuracy rate, etc.) of transforms (e.g., transforms with different types and/or numbers of parameters) as applied to the plurality of images. In the training, for example, one or more metrics may be evaluated for each of the plurality of images. Additionally, the accuracy of one or more transforms may be evaluated for each of the plurality of images. The criteria (e.g., threshold(s), decision rule(s), range(s), region(s), matching value(s), etc.) may be established based on the accuracy of the transform(s) in accordance with the metric(s). In some configurations, the criteria may include threshold(s) and/or decision rule boundaries that separate where different transforms perform better as indicated by image characterizations. For example, one boundary may separate a first region in a decision rule where a similarity transform performs the most accurately (out of a set of transforms) from a second region in a decision rule where an anisotropic scale transform performs the most accurately (out of a set of transforms) as indicated by a characterization (e.g., a metric vector including number of keypoints and distribution of keypoints). The boundary may be established as criteria (e.g., a threshold for a number of keypoints metric and a distribution of keypoints metric). In some configurations, the electronic device 102 may perform the training. In other configurations, the training may be received by the electronic device 102 and/or may be pre-loaded on the electronic device 102.

In the example illustrated in FIG. 9, the first criteria 915i includes a criterion for metric A 913a, a criterion for metric B 913b, and a criterion for metric L 913l, as indicated by the dots at the intersections of metric A 913a, metric B 913b and metric L 913l. The second criteria 915ii include a criterion for metric B 913b, a criterion for metric L 913l, and a criterion for metric M 913m. The third criteria 915iii include a criterion for metric L 913l. The fourth criteria 915iv include a criterion for metric M 913m. As illustrated by the example in FIG. 9, criteria may include a criterion for one, some, or all of the metrics.

In the example of FIG. 9, the first transform 917 of the transform set 925 may be selected if the first criteria 915i is met (e.g., if the criterion for metric A 913a is met, if the criteria for metric B 913b is met, and the criterion for metric L 913l is met). The second transform 919 of the transform set 925 may be selected if the second criteria 915ii is met (e.g., if the criterion for metric B 913b is met, if the criteria for metric L 913l is met, and the criterion for metric M 913m is met). The third transform 921 of the transform set 925 may be selected if the third criteria 915iii is met (e.g., if the criterion for metric L 913l is met). The fourth transform 923 of the transform set 925 may be selected if the fourth criteria 915iv is met (e.g., if the criterion for metric M 913m is met).

In some configurations, selecting a transform may proceed in a hierarchical order. For example, the electronic device 102 may first determine whether the first criteria 915i are met. The electronic device 102 may determine whether the second criteria 915ii are met if the first transform 917 is not selected and so on. Operation may proceed in the hierarchical order until a transform is selected.

Figure 10:
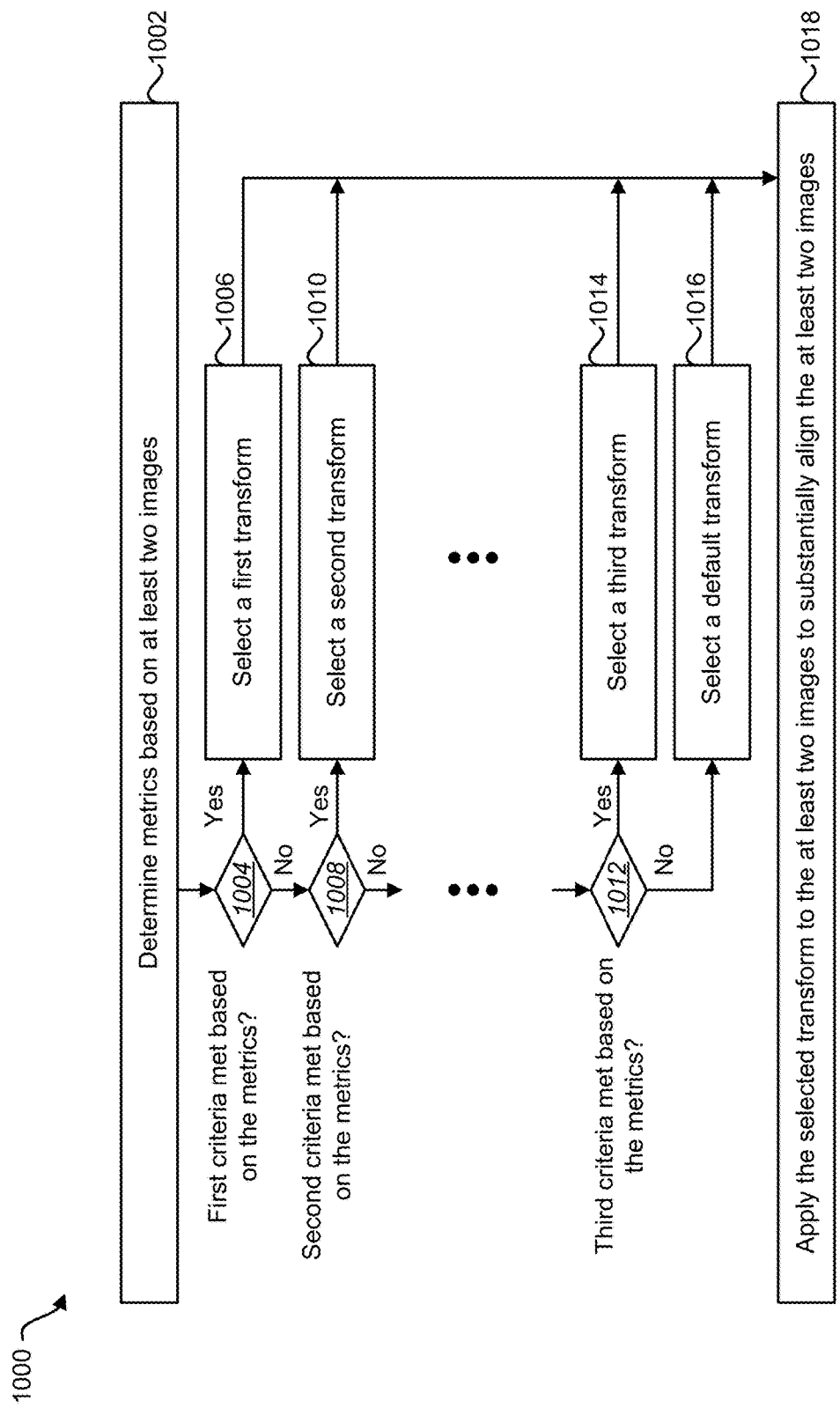
FIG. 10 is a flow diagram illustrating one configuration of a method for selecting at least one transform from a set of transforms based on the characterization.

FIG. 10 is a flow diagram illustrating one configuration of a method 1000 for selecting at least one transform from a set of transforms based on the characterization. The method 1000 may be one example of characterizing 204 structural content and selecting 206 at least one transform as described in connection with FIG. 2. The method 1000 may be performed by the electronic device 102 described in connection with FIG. 1.

The electronic device 102 may determine 1002 metrics based on at least two images. This may be accomplished as described in connection with one or more of FIGS. 1-3 and 8A-9.

The electronic device 102 may determine 1004 whether first criteria are met based on one or more of the metrics. This may be accomplished as described in connection with one or more of FIGS. 1-2 and 8A-9, for example. If the first criteria are met, the electronic device 102 may select 1006 a first transform. This may be accomplished as described in connection with one or more of FIGS. 1-2 and 8A-9, for example.

If the first criteria (e.g., one or more conditions) are not met, the electronic device 102 may determine 1008 whether second criteria are met based on one or more of the metrics. This may be accomplished as described in connection with one or more of FIGS. 1-2 and 8A-9, for example. If the second criteria are met, the electronic device 102 may select 1010 a second transform. This may be accomplished as described in connection with one or more of FIGS. 1-2 and 8A-9, for example. Determining whether criteria are met and selecting a corresponding transform may be done for any number of criteria as illustrated in FIG. 10.

If the foregoing (e.g., second) criteria is not met, the electronic device 102 may determine 1012 whether a third criteria are met based on one or more of the metrics. This may be accomplished as described in connection with one or more of FIGS. 1-2 and 8A-9, for example. If the third criteria are met, the electronic device 102 may select 1014 a third transform. This may be accomplished as described in connection with one or more of FIGS. 1-2 and 8A-9, for example. If none of the criteria are met, the electronic device 102 may select 1016 a default transform in some configurations.

The electronic device 102 may apply 1018 the selected transform to the at least two images to substantially align the two images. This may be accomplished as described in connection with one or more of FIGS. 1-2, 5, and 8A-9.

It should be noted that the method 1000 may be performed in a hierarchical order in some configurations. For example, the method 1000 may proceed in descending order by number of transform parameters. In another example, the method 1000 may proceed in ascending order by number of transform parameters.

Figure 11:
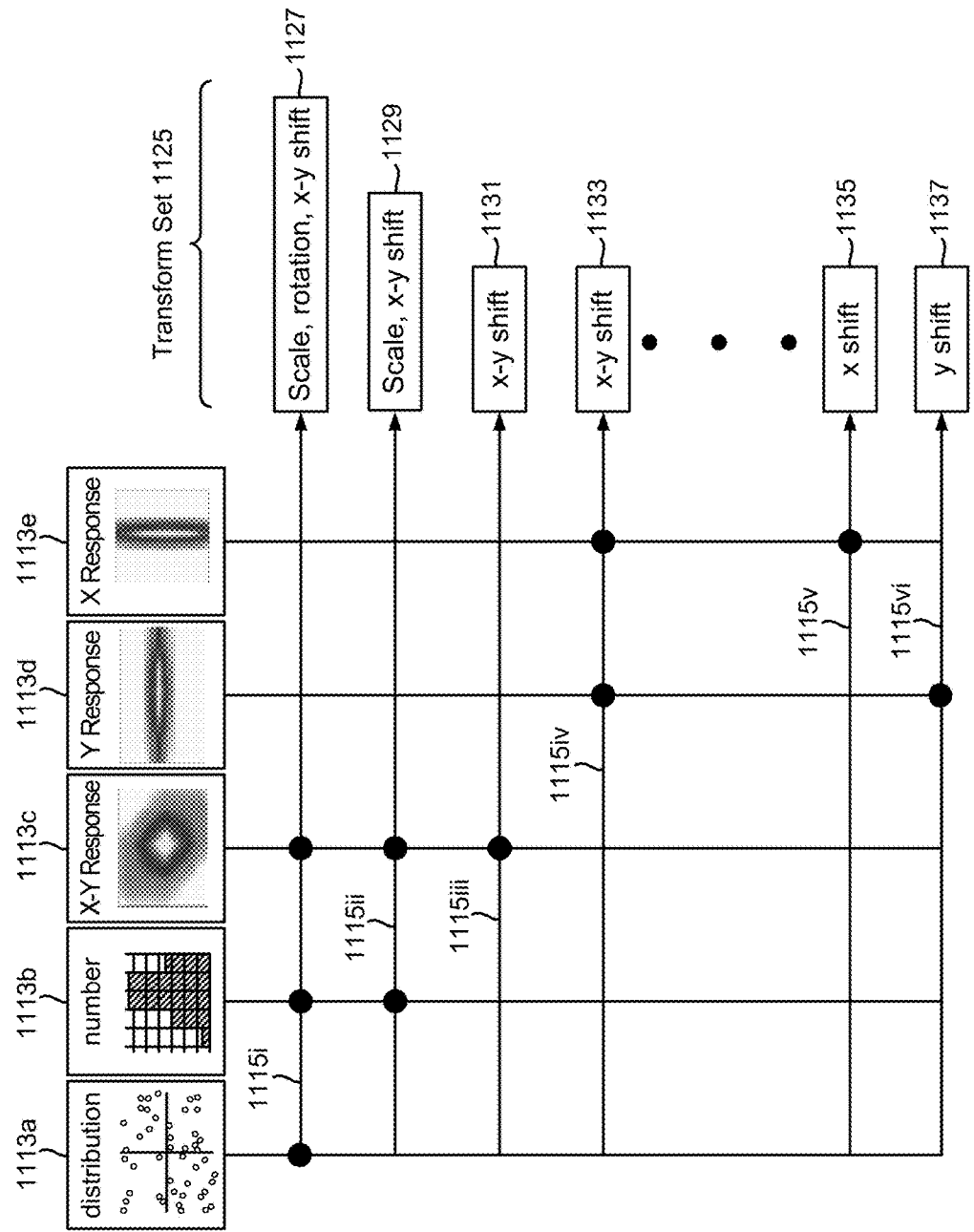
FIG. 11 is a diagram illustrating a more specific example of a transform set.

FIG. 11 is a diagram illustrating a more specific example of a transform set 1125. In particular, FIG. 11 illustrates one example of hierarchical parameter estimation. The transform set 1125 described in connection with FIG. 11 may be one example of the transform set 925 described in connection with FIG. 9. In this example, the transforms 1127, 1129, 1131, 1133, 1135, 1137 are arranged (e.g., ordered, ranked) in a transform hierarchy in accordance with a number of parameters that are estimated in the transform. For example, the scale, rotation, x-y shift transform 1127 may have the largest number of parameters in the transform set 1125, while the x shift transform 1135 and y shift transform 1137 have the smallest number of parameters in the transform set 1125.

In the example illustrated in FIG. 11, the transform set 1125 has a scale, rotation, x-y shift transform 1127 with a highest rank, while the scale, x-y shift transform 1129, x-y shift transform 1131, x-y shift transform 1133, x shift transform 1135, and y shift transform 1137 are ordered in descending order. While six transforms 1127, 1129, 1131, 1133, 1135, 1137 are illustrated in FIG. 11, it should be noted that two or more transforms may be utilized in accordance with the systems and methods disclosed herein.

Structure descriptors (e.g., metrics) may be utilized as described above. For example, image structure may be characterized (prior to parameter estimation, for instance). In some approaches, the image(s) may be characterized according to spatial distribution, pervasiveness, and/or transform response of one or more structures. In the example illustrated in FIG. 11, multiple metrics 1113a-e are illustrated. Specifically, a distribution metric 1113a, a number metric 1113b, an x-y response (e.g., transform response) metric 1113c, a y response (e.g., transform response) metric 1113d, and an x response (e.g., transform response) metric 1113e are illustrated. While five metrics 1113a-e are illustrated in FIG. 11, it should be noted that one or more metrics may be utilized in accordance with the systems and methods disclosed herein.

A transform (e.g., 2D transform) may be selected based on the characterization. This approach may be adaptive and robust. For example, this approach may offer improved transform utilization based on the degrees of freedom in the image data. This approach may also reduce or eliminate transform failure and/or may ensure a reliable user experience. As illustrated in FIG. 11, the transform may be selected in accordance with the distribution of structures (e.g., keypoints) 1113a, the number of structures 1113b, the x-y response metric 1113c, the y-response metric 1113d, and/or the x-response metric 1113e. As illustrated, the transforms may be arranged (and selected) in accordance with a hierarchy.

In some configurations, one or more transforms may be selected based on one or more metrics in accordance with one or more criteria. In the example illustrated in FIG. 11, the first criteria 1115i includes a criterion for the distribution metric 1113a, a criterion for the number metric 1113b, and a criterion for the x-y response metric 1113c, as indicated by the dots at the intersections of the distribution metric 1113a, the number metric 1113b and the x-y response metric 1113c. The second criteria 1115ii includes a criterion for number metric 1113b and a criterion for the x-y response metric 1113c. The third criteria 1115iii include a criterion for the x-y response metric 1113c. The fourth criteria 1115iv include a criterion for the y response metric 1113d and a criterion for the x response metric 1113e. The fifth criteria 1115v include a criterion for the x response metric 1113e. The sixth criteria 1115vi include a criterion for the y response metric 1113d.

In the example of FIG. 11, the scale, rotation, x-y shift transform 1127 of the transform set 1125 may be selected if the first criteria 1115i is met (e.g., if the criterion for the distribution metric 1113a is met, if the criteria for the number metric 1113b is met, and the criterion for the x-y response metric 1113c is met). The scale, x-y shift transform 1129 of the transform set 1125 may be selected if the second criteria 1115ii is met (e.g., if the criterion for the number metric 1113b is met and if the criteria for the x-y response metric 1113c is met). The x-y shift transform 1131 of the transform set 1125 may be selected if the third criteria 1115iii is met (e.g., if the criterion for the x-y response metric 1113c is met). The x-y shift transform 1133 of the transform set 1125 may be selected if the fourth criteria 1115iv is met (e.g., if the criterion for the x response metric 1113e and the criterion for the y response metric 1113d is met). The x shift transform 1135 of the transform set 1125 may be selected if the fifth criteria 1115v is met (e.g., if the criterion for the x response metric 1113e is met). The y shift transform 1137 of the transform set 1125 may be selected if the sixth criteria 1115vi is met (e.g., if the criterion for the y response metric 1113d is met). In some configurations, a criterion for a response metric (e.g., x-y response metric 1113c, y response metric 1113d and/or x response metric 1113e) may be met if one or more of (e.g., a threshold number of) that type of response are detected and/or if a ratio of response types (e.g., number of y responses to x responses) is in a particular range.

It should be noted that two x-y shift transforms 1131, 1133 are present to indicate that under both of these situations, the x-y shift can be estimated. In a case where the x-y shift can be estimated, for example, either a single feature (e.g., a corner, an x-y response, etc.) exists that provides information about the x and y shift, or two features (e.g., an x response and a y response) are present, each of which provides information on two different directions.

As illustrated in FIG. 11, parameters (e.g., transform parameters, a transform, etc.) may be selected based on the characterization. For example, the parameter(s) (e.g., transform) may be selected in accordance with one or more conditions applied to the characterization. For instance, if an image contains only y response information, a y-shift may be estimated. If an image contains only x response information, an x-shift may be estimated. If an image contains both x response and y response information (but does not include any x-y response (e.g., corner) information, for example), an x-y shift may be estimated. If an image contains x-y response information (e.g., a sufficient amount of x-y response information to estimate an x-y shift, but not enough to reliably estimate scale), an x-y shift may be estimated. If an image contains sufficient (e.g., a threshold number of) x-y responses, an x-y shift and scale may be estimated. If an image contains sufficient (e.g., a threshold number of) x-y responses and a sufficient distribution of features (e.g., type of distribution, a threshold distribution spread, etc.), then an x-y shift, scale, and rotation may be estimated. In some configurations, each of the transforms may be defined in terms of the parameters estimated in the transform. For example, each of the parameters mentioned in the transforms (e.g., scale, rotation, x-y shift, x shift, y shift, etc.) may define the transform. In some configurations, a transform set (e.g., transform set 925, 1125) may be defined as a single transform with different sets of one or more parameters. For example, the scale, x-y shift transform 1129 may be viewed as the scale, rotation, x-y shift transform, albeit with fewer parameters estimated (e.g., without rotation).

Figure 12:
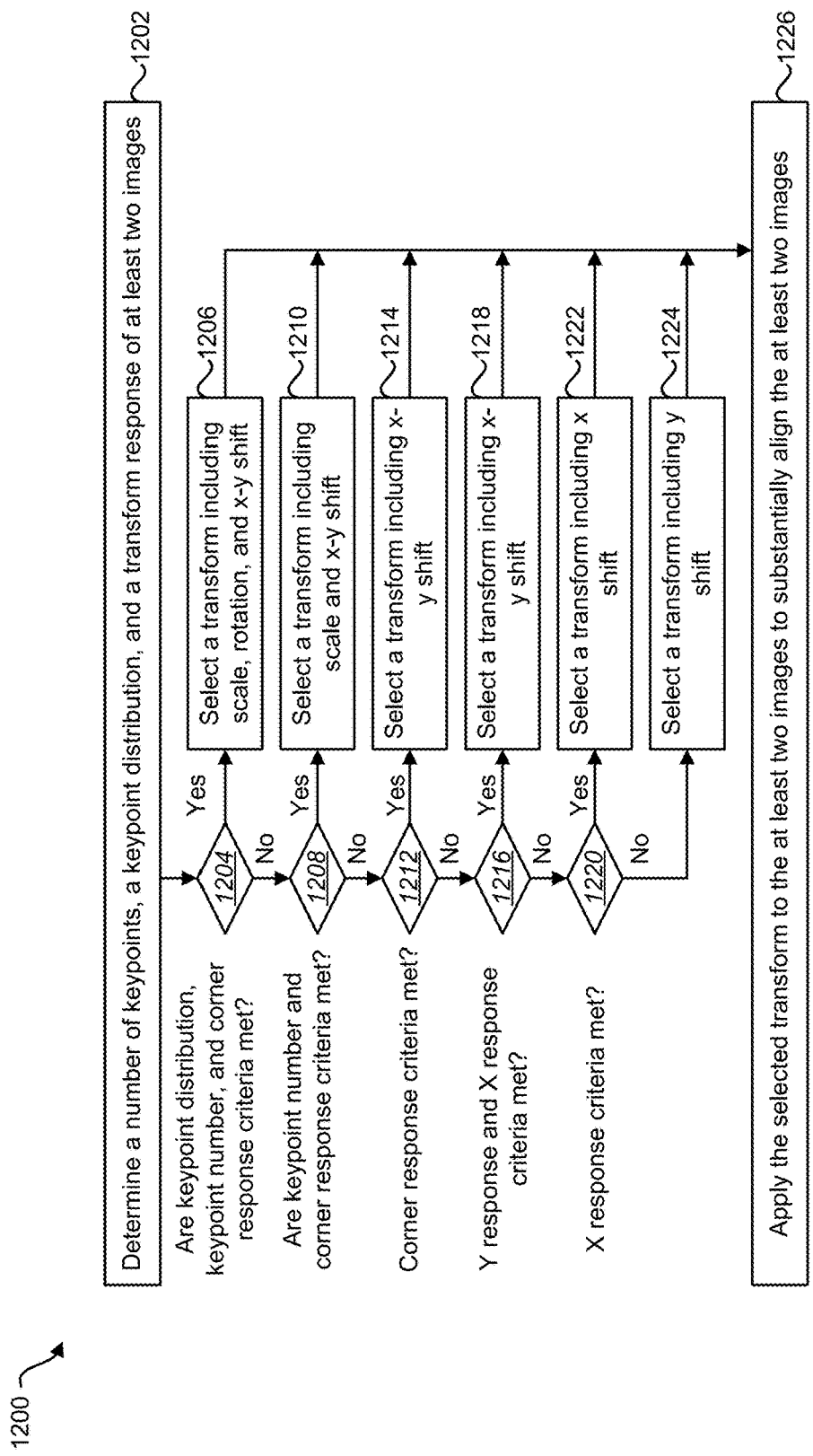
FIG. 12 is a flow diagram illustrating a more specific configuration of a method for selecting at least one transform from a set of transforms based on the characterization.

FIG. 12 is a flow diagram illustrating a more specific configuration of a method 1200 for selecting at least one transform from a set of transforms based on the characterization. The method 1200 may be one example of one or more of the methods 200, 1000 described in connection with one or more of FIGS. 10 and 12. The method 1200 may be performed by the electronic device 102 described in connection with FIG. 1.

The electronic device 102 may determine 1202 a number of keypoints, a keypoint distribution, and a transform response of at least two images. This may be accomplished as described in connection with one or more of FIGS. 1-3 and 8A-11.

The electronic device 102 may determine 1204 whether keypoint distribution, keypoint number, and corner response criteria are met based on the metrics (e.g., number of keypoints, keypoint distribution, and transform response). This may be accomplished as described in connection with one or more of FIGS. 1-2 and 8A-11, for example. If the keypoint distribution, keypoint number, and corner response criteria are met, the electronic device 102 may select 1206 a transform including scale, rotation, and x-y shift parameters. This may be accomplished as described in connection with one or more of FIGS. 1-2 and 8A-11, for example.

If the keypoint distribution, keypoint number, and corner response criteria are not met, the electronic device 102 may determine 1208 whether keypoint number and corner response criteria are met based on the number of keypoints and the transform response. This may be accomplished as described in connection with one or more of FIGS. 1-2 and 8A-11, for example. If the keypoint number and corner response criteria are met, the electronic device 102 may select 1210 a transform including scale and x-y shift parameters. This may be accomplished as described in connection with one or more of FIGS. 1-2 and 8A-11, for example.

If the keypoint number and corner response criteria are not met, the electronic device 102 may determine 1212 whether corner response criteria are met based on the transform response. This may be accomplished as described in connection with one or more of FIGS. 1-2 and 8A-11, for example. If the corner response criteria are met, the electronic device 102 may select 1214 a transform including x-y shift parameters. This may be accomplished as described in connection with one or more of FIGS. 1-2 and 8A-11, for example.

If the corner response criteria are not met, the electronic device 102 may determine 1216 whether y response and x response criteria are met based on the transform response. This may be accomplished as described in connection with one or more of FIGS. 1-2 and 8A-11, for example. If the y response and x response criteria are met, the electronic device 102 may select 1218 a transform including x-y shift parameters. This may be accomplished as described in connection with one or more of FIGS. 1-2 and 8A-11, for example.

If the y response and x response criteria are not met, the electronic device 102 may determine 1220 whether x response criteria are met based on the transform response. This may be accomplished as described in connection with one or more of FIGS. 1-2 and 8A-11, for example. If the x response criteria are met, the electronic device 102 may select 1222 a transform including an x shift parameter. This may be accomplished as described in connection with one or more of FIGS. 1-2 and 8A-11, for example. If the x response criteria are not met, the electronic device 102 may select 1224 a transform including a y shift parameter. This may be accomplished as described in connection with one or more of FIGS. 1-2 and 8A-11, for example.

The electronic device 102 may apply 1218 the selected transform to the at least two images to substantially align the two images. This may be accomplished as described in connection with one or more of FIGS. 1-2, 5, and 8A-10.

FIG. 13A illustrates an example of a structure distribution 1339 for a Monte-Carlo simulation. FIG. 13B illustrates an example of a response distribution 1341 for the Monte-Carlo simulation. FIG. 13A and FIG. 13B illustrate plots in height (pixels) 1348a-b over width (pixels) 1350a-b. In particular, a stochastic simulation was performed to verify performance. The data was averaged over spatial distribution, transform response, and number of structures. This testing may be performed in order to train criteria (e.g., decision rules, thresholds, ranges, etc.) for use in selecting which transform to use based on an image characterization.

FIG. 14A illustrates an example of a spatial transformation 1443. FIG. 14B illustrates an example of a response transformation 1445 corresponding to the spatial transformation of FIG. 14A. FIG. 14A and FIG. 14B illustrate plots in height (pixels) 1448a-b over width (pixels) 1450a-b. It should be noted that in FIG. 14A (in comparison to FIG. 13A), the lines are slightly deformed corresponding to a 1 degree rotation and small scale change.

Figures 15A, 15B:
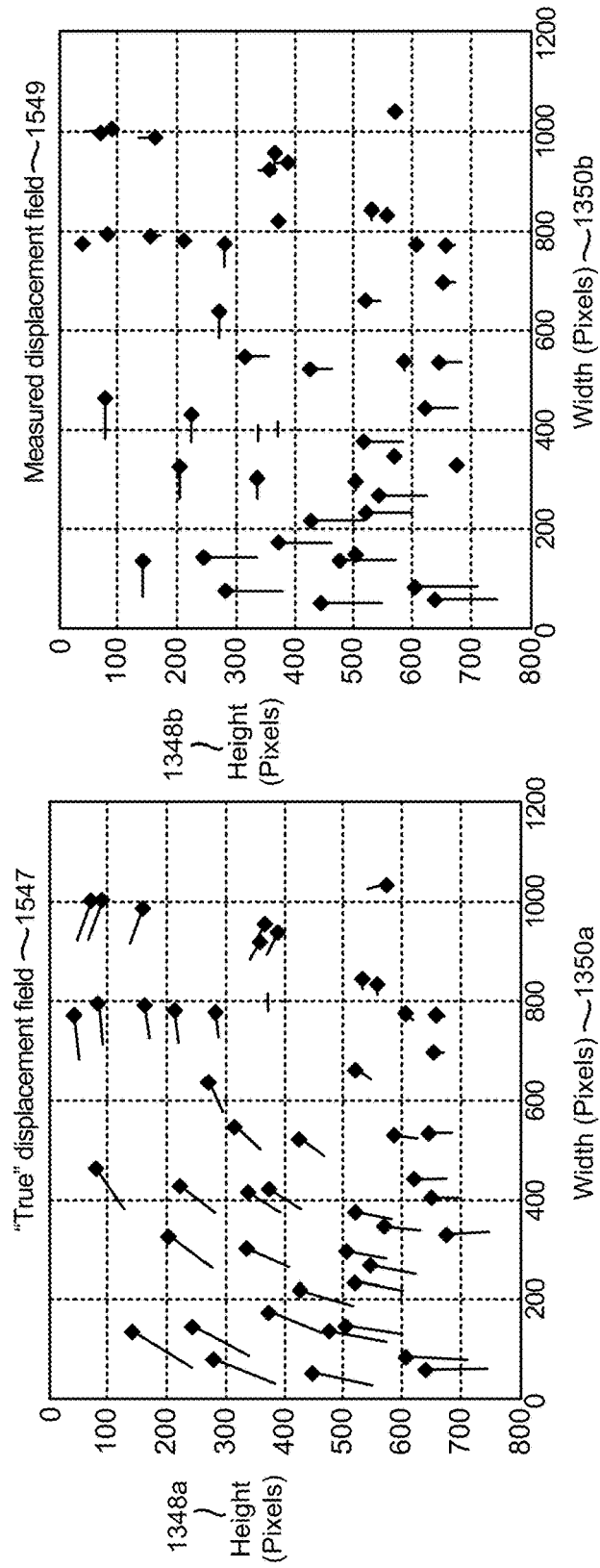
FIG. 15A illustrates an example of a "true" displacement field.
FIG. 15B illustrates an example of a measured displacement field corresponding to the displacement field of FIG. 15A.

FIG. 15A illustrates an example of a "true" displacement field 1547. FIG. 15B illustrates an example of a measured displacement field 1549 corresponding to the displacement field of FIG. 15A. As illustrated in FIGS. 13A-B and 14A-B, if the image is only allowed to have vertical and horizontal lines, the response will only correspond along one axis (e.g., a vertical or horizontal axis). In this case, the measured displacement field may be only a projection of the "true"

displacement field onto one axis. FIGS. 15A and 15B indicate a significant decrease in estimation accuracy resulting from attempting to estimate a transform not supported by the "richness" of the data. This illustrates that more complex transforms (e.g., transforms with more parameters) may be better suited for images with more structural information available. Accordingly, it may be beneficial to select a transform that performs well depending on the amount of structural information available in the images.

FIG. 16 depicts a plot that illustrates a parameter estimation envelope (e.g., RMS pixel estimation error). The plot is illustrated in number of lines 1651 over a fraction of vertical and horizontal lines 1653 (e.g., a ratio of vertical and horizontal lines). The error 1654 is illustrated with a range of shades. For clarity, approximate numerical errors are also written on the plot. In FIG. 16, the plot illustrates a portfolio of parameters such that the RMS is guaranteed to be less than 2 pixels. The value of the desired RMS error may be configurable (by a user, for example) and may depend on the application. In the example of FIG. 16, the unshaded (e.g., white) region that does not illustrate any RMS values, since any combination of input parameters that may result in an error in the unshaded (e.g., white) region may be too large an RMS error for this example and thus is not shown in the plot. Accordingly, the plot illustrates the frontier of parameters such that the RMS error is less than 2 pixels.

The fraction of vertical and horizontal lines 1653 is an example of a metric that may be utilized herein. For example, the parameter subset (e.g., the selected transform) may be automatically adjusted based on characterization results. For instance, a number of structures vs. quality of transform response (e.g., pixel estimation error) are illustrated in the plot. An error threshold may be based on an application's tolerance to errors. The systems and methods disclosed herein may limit the parameter set to guarantee prior performance selection criteria.

In some configurations, the parameter estimation envelope may be utilized in characterization and/or transform selection. In one example, every application may require a different accuracy in the mapping. In some configurations, for example, a transform may be selected for a region that has 0.8 RMS pixel estimation error or less. As described above, the threshold may be selected based on an application. For example, another application may tolerate RMS pixel estimation errors of up to 1. Accordingly, the threshold for selecting a transform may be set to the region where RMS pixel estimation error is at 1 or less. For instance, instant autofocus may be more tolerant to errors than a dense depth map. Performance portfolios such as shown in FIG. 16 illustrate when a simpler transformation (which may be faster to execute and/or may require less power) may suffice as opposed to a more complicated transformation. In another example, given knowledge of such tables as shown in FIG. 16, an algorithm may be allowed to adaptively provide improved possible alignment results (to a user, for example) based on the scene information, and may avoid estimating a transformation if the data does not support it. Even if theoretically it is possible to compute such a transformation, tables such as shown in FIG. 16 with units of variance can avoid transformations if the variance is too high to warrant it.

Figure 17:
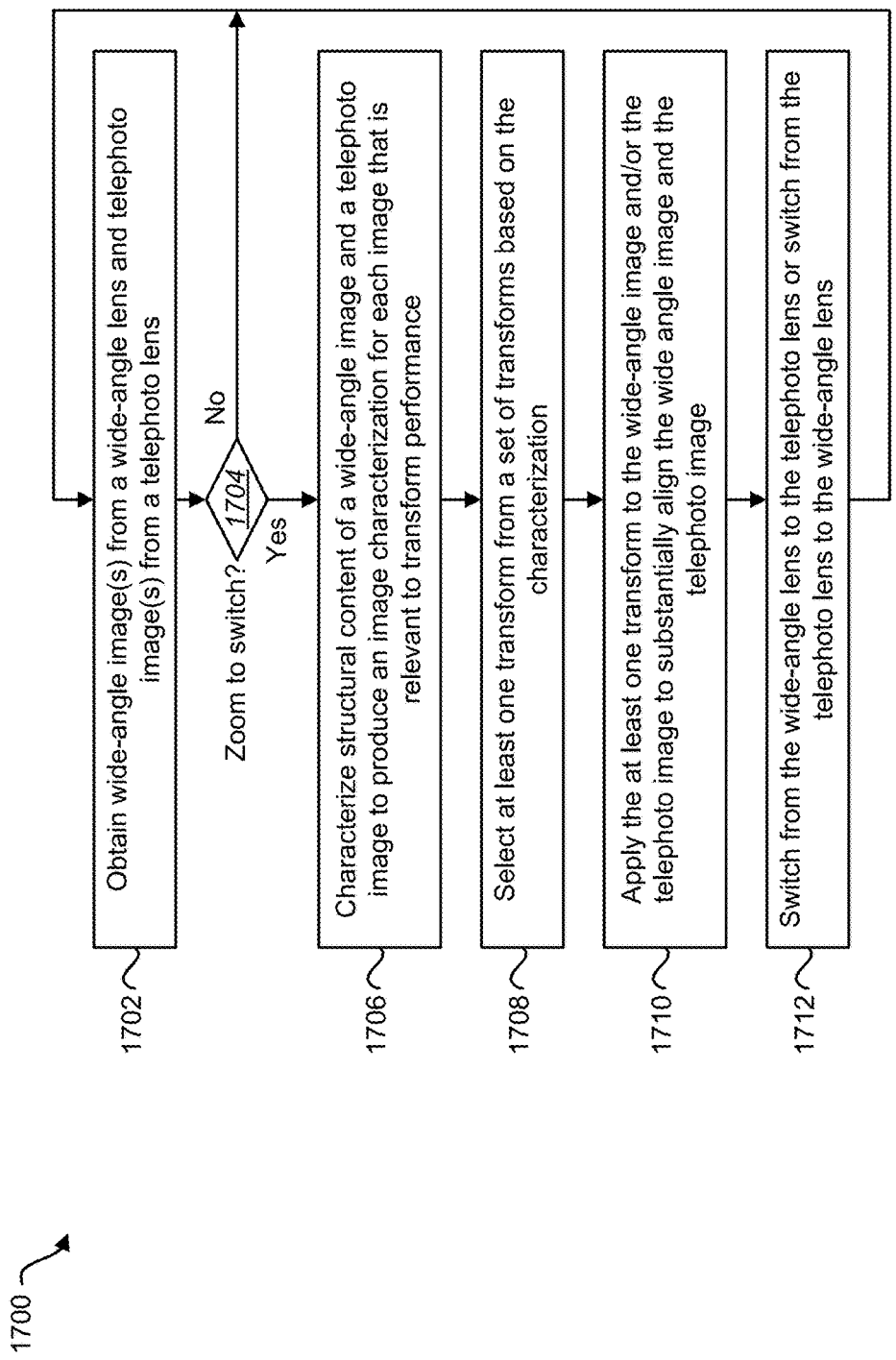
FIG. 17 is a flow diagram illustrating one configuration of a method for lens switching.

FIG. 17 is a flow diagram illustrating one configuration of a method 1700 for lens switching. The method may be performed by the electronic device 102 described in connection with FIG. 1.

The electronic device 102 may obtain 1702 one or more wide-angle images from a wide-angle lens and one or more telephoto images from a telephoto lens. This may be accomplished as described above in connection with FIG. 1.

The electronic device 102 may determine 1704 whether a zoom to a switch point (or range) has occurred (e.g., has occurred, is occurring, and/or will occur). For example, the electronic device 102 may track a zoom factor on one or more lenses (e.g., optical systems, image sensors, cameras, etc.). The zoom may be an optical zoom, a digital zoom, or a hybrid of both. In one example, the electronic device 102 may be currently streaming images (e.g., image frames) from a wide-angle lens (for recording, display, etc.). As the electronic device 102 increases zoom (based on an automatic zoom and/or based on a received input indicating zoom (e.g., manual zoom)), a switch point or range may be reached, where the electronic device 102 will transition to streaming images from the telephoto lens to provide increased zoom. In some configurations, the switch point may be at a particular zoom factor. For example, the switch point may be a zoom factor at which the electronic device 102 switches from one lens to another (e.g., wide-angle to telephoto or telephoto to wide-angle). Additionally or alternatively, a switch region may be used that covers a range of zoom factors. If a zoom to a switch point or range has not occurred, the electronic device 102 may return to obtaining 1702 wide-angle image(s) and/or telephoto image(s).

If a zoom to a switch point or range has occurred, the electronic device 102 may characterize 1706 structural content of a wide-angle image and a telephoto image to produce an image characterization (e.g., one or more metrics) for each image that is relevant to transform performance. This may be accomplished as described above in connection with one or more of FIGS. 1-3 and 8A-12.

The electronic device 102 may select 1708 at least one transform from a set of transforms based on the characterization. This may be accomplished as described above in connection with one or more of FIGS. 1-3 and 8A-12.

The electronic device 102 may apply 1710 the at least one transform to the wide-angle image and/or the telephoto image to substantially align the wide angle image and the telephoto image. This may be accomplished as described above in connection with one or more of FIGS. 1-3 and 8A-12.

The electronic device 102 may switch 1712 from the wide-angle lens to the telephoto lens or may switch 1712 from the telephoto lens to the wide-angle lens. For example, the electronic device 102 may switch streaming images from one lens (e.g., the wide-angle lens or the telephoto lens) to another lens (e.g., the telephoto lens or the wide-angle lens).

It should be noted that the steps of the method 1700 may be performed in different orders and/or two or more steps may be performed concurrently in some configurations. For example, the electronic device 102 may obtain 1702 image(s), characterize 1706 the structural content, select 1708 a transform, and then may determine 1704 whether a zoom to a switch point has occurred and may apply 1710 the transform and switch 1712 lenses. For instance, the electronic device 102 may continuously (e.g., regularly) perform analysis (e.g., characterizing structural content, selecting a transform, and/or applying the transform) with images from both lenses concurrently in some configurations.

In other configurations, the analysis may not begin until the zoom factor is within the zoom range. This may conserve processing resources when a lens switch is unlikely to occur. For example, the electronic device 102 may perform steps 1706, 1708, and 1710 while in a zoom switch range and then may switch 1712 once the zoom has reached a zoom point. For instance, when entering one end of the zoom range, the electronic device 102 may prepare to switch lenses (e.g., may start analyzing images from another lens while still streaming from the current lens, may begin combining images from both lenses, etc.). Other approaches (e.g., different sequences, timings, orders of steps, etc.) to the method 1700 may be implemented.

Figure 18:
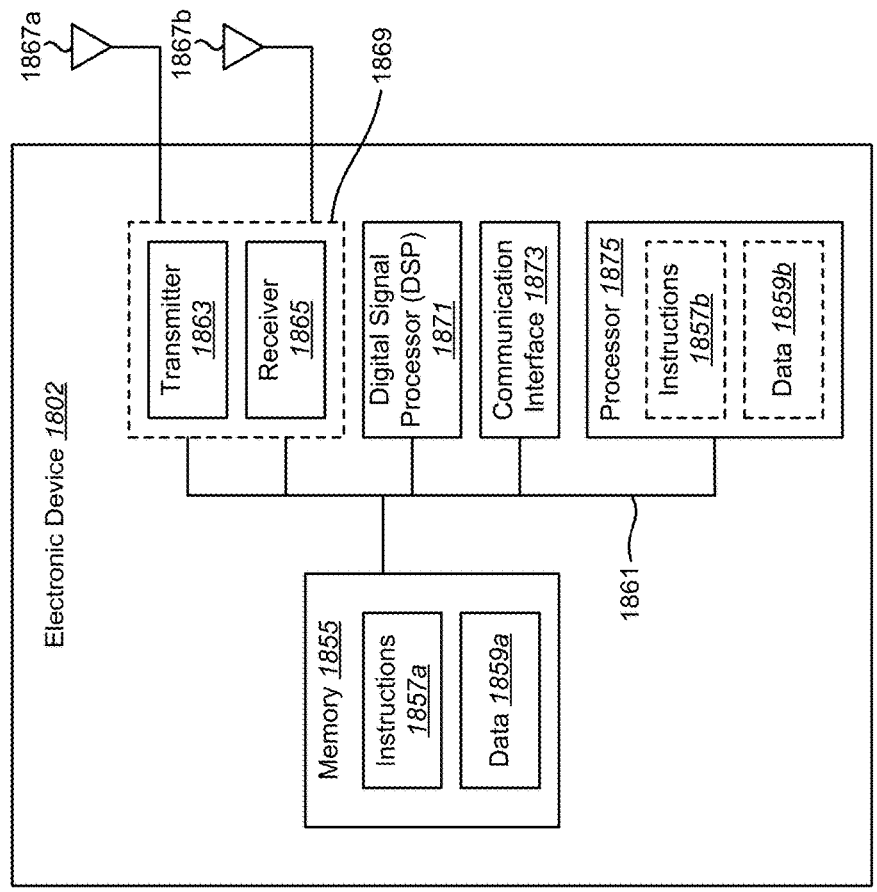
FIG. 18 illustrates certain components that may be included within an electronic device.

FIG. 18 illustrates certain components that may be included within an electronic device 1802. The electronic device 1802 may be an example of and/or may be implemented in accordance with the electronic device 102 described in connection with FIG. 1. The electronic device 1802 may be (or may be included within) a camera, video camcorder, digital camera, cellular phone, smart phone, computer (e.g., desktop computer, laptop computer, etc.), tablet device, media player, television, automobile, personal camera, action camera, surveillance camera, mounted camera, connected camera, robot, aircraft, drone, unmanned aerial vehicle (UAV), healthcare equipment, gaming console, personal digital assistants (PDA), set-top box, etc. The electronic device 1802 includes a processor 1875. The processor 1875 may be a general purpose single- or multi-chip microprocessor (e.g., an ARM), a special purpose microprocessor (e.g., a digital signal processor (DSP)), a microcontroller, a programmable gate array, etc. The processor 1875 may be referred to as a central processing unit (CPU). Although just a single processor 1875 is shown in the electronic device 1802, in an alternative configuration, a combination of processors (e.g., an ARM and DSP) could be used.

The electronic device 1802 also includes memory 1855. The memory 1855 may be any electronic component capable of storing electronic information. The memory 1855 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1859*a* and instructions 1857*a* may be stored in the memory 1855. The instructions 1857*a* may be executable by the processor 1875 to implement one or more of the methods 200, 1000, 1200, 1700 described herein. Executing the instructions 1857*a* may involve the use of the data 1859*a* that is stored in the memory 1855. When the processor 1875 executes the instructions 1857, various portions of the instructions 1857*b* may be loaded onto the processor 1875, and various pieces of data 1859*b* may be loaded onto the processor 1875.

The electronic device 1802 may also include a transmitter 1863 and a receiver 1865 to allow transmission and reception of signals to and from the electronic device 1802. The transmitter 1863 and receiver 1865 may be collectively referred to as a transceiver 1869. One or multiple antennas 1867*a-b* may be electrically coupled to the transceiver 1869. The electronic device 1802 may also include (not shown) multiple transmitters, multiple receivers, multiple transceivers and/or additional antennas.

The electronic device 1802 may include a digital signal processor (DSP) 1871. The electronic device 1802 may also include a communication interface 1873. The communication interface 1873 may enable one or more kinds of input and/or output. For example, the communication interface 1873 may include one or more ports and/or communication devices for linking other devices to the electronic device 1802. Additionally or alternatively, the communication interface 1873 may include one or more other interfaces (e.g., touchscreen, keypad, keyboard, microphone, camera, etc.). For example, the communication interface 1873 may enable a user to interact with the electronic device 1802.

The various components of the electronic device 1802 may be coupled together by one or more buses, which may include a power bus, a control signal bus, a status signal bus, a data bus, etc. For the sake of clarity, the various buses are illustrated in FIG. 18 as a bus system 1861.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. An electronic device for selecting a transform, comprising:
   at least one image sensor;
   a memory;
   a processor coupled to the memory and to the at least one image sensor, wherein the processor is configured to:
   obtain at least two images from the at least one image sensor;
   characterize structural content of each of the at least two images to produce a characterization for each image that quantifies the structural content, wherein the processor is configured to extract keypoints from at least one of the images;
   select at least one transform from a set of transforms based on at least one characterization by determining whether a number of the extracted keypoints meets a keypoint number criterion and whether a keypoint distribution of the extracted keypoints meets a keypoint distribution criterion; and
   apply the at least one transform to at least one of the images to substantially align the at least two images.

2. The electronic device of claim 1, wherein the processor is configured to characterize the structural content by determining one or more metrics, wherein the one or more metrics comprise at least one of a spatial response, structure pervasiveness, spatial distribution, or transform response.

3. The electronic device of claim 2, wherein the processor is configured to compare the one or more metrics to one or more thresholds.

4. The electronic device of claim 1, wherein the set of transforms is arranged in a hierarchy of transforms, and wherein the processor is configured to select the at least one transform based on the hierarchy.

5. The electronic device of claim 4, wherein the processor is configured to determine whether to select the at least one transform proceeding in a hierarchical order, wherein the hierarchy is ordered by a number of transform parameters associated with each of the transforms in the set of transforms.

6. The electronic device of claim 1, wherein the processor is configured to characterize the structural content by at least one of determining a number of structures, determining a spatial distribution of structures, or determining a transform response.

7. The electronic device of claim 1, wherein the processor is configured to perform at least one of registering, rectifying, or warping the at least one of the at least two images based on the at least one transform.

8. The electronic device of claim 7, wherein the processor is configured to compute a reprojection error.

9. The electronic device of claim 1, further comprising at least two lenses, wherein the processor is configured to switch between the at least two lenses based on the image alignment.

10. The electronic device of claim 1, wherein the set of transforms comprises: a transform including scale, rotation, and x-y shift; a transform including scale and x-y shift; a transform including x-y shift; a transform including x shift; and a transform including y shift.

11. The electronic device of claim 1, wherein the processor is configured to select a transform based on a look-up table of application accuracy requirements.

12. A method for selecting a transform performed by an electronic device, comprising:
    obtaining at least two images;
    characterizing structural content of each of the at least two images to produce a characterization for each image that quantifies the structural content, comprising extracting keypoints from at least one of the images;
    selecting at least one transform from a set of transforms based on at least one characterization by determining whether a number of the extracted keypoints meets a keypoint number criterion and whether a keypoint distribution of the extracted keypoints meets a keypoint distribution criterion; and
    applying the at least one transform to at least one of the images to substantially align the at least two images.

13. The method of claim 12, wherein characterizing the structural content comprises determining one or more metrics, wherein the one or more metrics comprise at least one of a spatial response, structure pervasiveness, spatial distribution, or transform response.

14. The method of claim 13, wherein selecting the at least one transform comprises comparing the one or more metrics to one or more thresholds.

15. The method of claim 12, wherein the set of transforms is arranged in a hierarchy of transforms, and wherein selecting the at least one transform is based on the hierarchy.

16. The method of claim 15, wherein selecting the at least one transform comprises determining whether to select the at least one transform proceeding in a hierarchical order, wherein the hierarchy is ordered by a number of transform parameters associated with each of the transforms in the set of transforms.

17. The method of claim 12, wherein characterizing the structural content comprises at least one of determining a number of structures, determining a spatial distribution of structures, or determining a transform response.

18. The method of claim 12, further comprising performing at least one of registering, rectifying, or warping the at least one of the at least two images based on the at least one transform.

19. The method of claim 18, further comprising computing a reprojection error.

20. The method of claim 12, further comprising switching between at least two lenses based on the image alignment.

21. The method of claim 12, wherein the set of transforms comprises: a transform including scale, rotation, and x-y shift; a transform including scale and x-y shift; a transform including x-y shift; a transform including x shift; and a transform including y shift.

22. The method of claim 12, further comprising selecting a transform based on a look-up table of application accuracy requirements.

23. A computer-program product for selecting a transform, comprising a non-transitory tangible computer-readable medium having instructions thereon, the instructions comprising:
    code for causing an electronic device to obtain at least two images;
    code for causing the electronic device to characterize structural content of each of the at least two images to produce a characterization for each image that quantifies the structural content, comprising code for causing the electronic device to extract keypoints from at least one of the images;
    code for causing the electronic device to select at least one transform from a set of transforms based on at least one characterization comprising code for causing the electronic device to determine whether a number of the extracted keypoints meets a keypoint number criterion and whether a keypoint distribution of the extracted keypoints meets a keypoint distribution criterion; and
    code for causing the electronic device to apply the at least one transform to at least one of the images to substantially align the at least two images.

24. The computer-program product of claim 23, wherein the code for causing the electronic device to characterize the structural content comprises code for causing the electronic device to determine one or more metrics, wherein the one or more metrics comprise at least one of a spatial response, structure pervasiveness, spatial distribution, or transform response.

25. The computer-program product of claim 23, wherein the set of transforms is arranged in a hierarchy of transforms, and wherein the code for causing the electronic device to select the at least one transform is based on the hierarchy.

26. The computer-program product of claim 23, wherein the code for causing the electronic device to characterize the structural content comprises at least one of code for causing the electronic device to determine a number of structures, code for causing the electronic device to determine a spatial distribution of structures, and code for causing the electronic device to determine a transform response.

27. An apparatus for selecting a transform, comprising:
    means for obtaining at least two images;
    means for characterizing structural content of each of the at least two images to produce a characterization for each image that quantifies the structural content, comprising means for extracting keypoints from at least one of the images;
    means for selecting at least one transform from a set of transforms based on at least one characterization comprising means for determining whether a number of the extracted keypoints meets a keypoint number criterion and whether a keypoint distribution of the extracted keypoints meets a keypoint distribution criterion; and
    means for applying the at least one transform to at least one of the images to substantially align the at least two images.

28. The apparatus of claim 27, wherein the means for characterizing the structural content comprises means for determining one or more metrics, wherein the one or more metrics comprise at least one of a spatial response, structure pervasiveness, spatial distribution, or transform response.

29. The apparatus of claim 27, wherein the set of transforms is arranged in a hierarchy of transforms, and wherein the means for selecting the at least one transform is based on the hierarchy.

30. The apparatus of claim 27, wherein the means for characterizing the structural content comprises at least one of means for determining a number of structures, means for determining a spatial distribution of structures, and means for determining a transform response.

* * * * *